United States Patent
Singh et al.

(10) Patent No.: US 10,708,660 B2
(45) Date of Patent: **\*Jul. 7, 2020**

(54) SYSTEMS AND METHODS FOR PROVIDING SUMMARIZED VIEWS OF A MEDIA ASSET IN A MULTI-WINDOW USER INTERFACE

(71) Applicant: Rovi Guides, Inc., San Jose, CA (US)

(72) Inventors: Gyanveer Singh, Bihar (IN); Arun Sreedhara, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,158

(22) Filed: Jul. 26, 2018

(65) Prior Publication Data
US 2019/0058920 A1 Feb. 21, 2019

Related U.S. Application Data

(63) Continuation of application No. 15/678,593, filed on Aug. 16, 2017, now Pat. No. 10,063,927.

(51) Int. Cl.
| | |
|---|---|
| *H04N 21/23* | (2011.01) |
| *H04N 21/472* | (2011.01) |
| *H04N 21/262* | (2011.01) |
| *H04N 21/266* | (2011.01) |
| *H04N 21/435* | (2011.01) |
| *H04N 21/81* | (2011.01) |
| *H04N 21/235* | (2011.01) |
| *H04N 21/8549* | (2011.01) |
| *H04N 21/431* | (2011.01) |
| *H04N 21/845* | (2011.01) |
| *H04N 21/8405* | (2011.01) |

(52) U.S. Cl.
CPC ....... *H04N 21/47205* (2013.01); *H04N 21/23* (2013.01); *H04N 21/2353* (2013.01); *H04N 21/266* (2013.01); *H04N 21/26266* (2013.01); *H04N 21/26291* (2013.01); *H04N 21/435* (2013.01); *H04N 21/4316* (2013.01); *H04N 21/47217* (2013.01); *H04N 21/8133* (2013.01); *H04N 21/8405* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 2002/0007485 A1* | 1/2002 | Rodriguez | H04N 5/44543 725/1 |
| 2003/0093790 A1* | 5/2003 | Logan | G10H 1/0033 725/38 |
| 2007/0157249 A1* | 7/2007 | Cordray | G06F 3/0482 725/58 |

\* cited by examiner

*Primary Examiner* — Cai Y Chen
(74) *Attorney, Agent, or Firm* — Haley Guiliano LLP

(57) ABSTRACT

Systems and methods are disclosed herein for automatically providing summarized views of a media asset in a multi-window user interface. For example, a media guidance application may generate a summary view of a media asset by including important content portions into the summary view based on metadata of the content portion. The media guidance application may display the summary view, and missed content in parallel at different windows of the same user equipment. The missed content and the summary view may be coordinated to be displayed in synchronization. In this way, when a user watches the summary view at a center window on the user equipment, the user may also have the option to watch the missed content displayed simultaneously on a side window to catch up on the missed content.

20 Claims, 12 Drawing Sheets

SYSTEMS AND METHODS FOR PROVIDING SUMMARIZED VIEWS OF A MEDIA ASSET IN A MULTI-WINDOW USER INTERFACE

CROSS REFERENCE TO RELATED APPLICATION

This application is a continuation of U.S. patent application Ser. No. 15/678,593, filed Aug. 16, 2017, currently allowed, which is hereby incorporated by reference herein in its entirety.

BACKGROUND

In related art systems, a user sometimes may not have the time to watch an entire program, e.g., a two-hour-long reality television show, etc. Related art systems may present a "highlight reel" or "preview" to the user to watch the program in a relatively short time duration, e.g., five minutes, ten minutes, etc. For example, related art systems may generate a "preview" of a two-hour-long program by periodically sampling the program with short portions to form a five-minute long preview, e.g., taking a 20-second excerpt every ten minutes of the program. However, by only watching the preview, the user may miss information from the program, for example, the introduction of a new character, a change of scene, etc.

SUMMARY

Systems and methods are disclosed herein for automatically providing summarized views of a media asset in a multi-window user interface. For example, a media guidance application may generate a summary view of a media asset, by including important content portions in the summary view based on metadata of the content portion. Thus content portions from the media asset that are not included into the summary view may be missed by the user. The media guidance application may display the summary view and the missed content in parallel or simultaneously at different windows of the same user equipment. The missed content and the summary view may be coordinated to be displayed in synchronization. In this way, when a user watches the summary view at a center window on the user equipment, the user may also have the option to watch the missed content displayed simultaneously on a side window to catch up on the missed content.

To this end and others, in some aspects of the disclosure, the media guidance application may obtain, from a media data source, a media asset. For example, the media guidance application, e.g., implemented on a set-top box, may receive a television program from a data source at a television network, etc. The media guidance application may determine a plurality of consecutive content portions from the media asset. For example, the media guidance application may determine a type of the media asset based on metadata associated with the media asset, e.g., a television show, a news program, a tennis match, a soccer game, etc. The media guidance application may define a content portion as a basic unit for the media asset, the length of which is pre-determined based on the type of the media asset. The media guidance application may then retrieve a pre-determined duration for a content portion corresponding to the type of the media asset. The media guidance application may then divide the media asset into the plurality of consecutive content portions (e.g., by tagging the media asset with a starting time and an ending time for each content portion), each of which has the pre-determined duration.

In some embodiments, the media guidance application may generate a summary view of the media asset including a subset of the plurality of consecutive content portions. For each respective content portion from the plurality of consecutive content portions, the media guidance application may determine an importance level of the respective content portion based at least in part on metadata (e.g., subtitle, etc.) corresponding to the respective content portion. For example, the media guidance application may determine a type of the media asset based on metadata associated with the media asset, e.g., a soccer game, a tennis game, a reality show, a television drama, etc. The media guidance application may then retrieve an importance table based on the type of the media asset, and/or the title of the media asset. The media guidance application may extract a first set of keywords from metadata corresponding to the respective content portion, and query the importance table based on the first set of keywords to obtain one or more importance scores corresponding to the first set of keywords. The media guidance application may then assign an average value of the one or more importance scores to the importance level corresponding to the respective content portion.

In some embodiments, the media guidance application may determine the importance level of the respective content portion based on electronic communications, e.g., social media posts, etc., shared relating to the content portion. For example, the media guidance application may obtain, during a period of time corresponding to the respective content portion, a plurality of publicly shared electronic communications by users. Each of the plurality of publicly shared electronic communications may includes a first indicator (e.g., a hashtag) relating to the media asset. The media guidance application may then determine a subset of the plurality of publicly shared electronic communications that have one or more indicators corresponding to the one or more keywords (e.g., extracted from metadata corresponding to the respective content portion). The media guidance application may determine a ratio between a total count of the subset of the plurality of publicly shared electronic communications and a total count of the plurality of publicly shared electronic communications, and assign the ratio to the importance level. In response to determining that the importance level is higher than an importance threshold, the media guidance application may add the respective content portion to the subset of the plurality of consecutive content portions.

In some embodiments, the media guidance application may identify a content segment including one or more consecutive content portions from the subset of the plurality of consecutive content portions. The media guidance application may cluster consecutive content portions that closely relate to one another into a content segment to be included in the summary review. For example, if a content portion showing a penalty goal is selected as part of the summary view, the media guidance application may include the preceding content portion that includes the foul in the summary view as well, as the two content portions are closely related. For a respective content portion that has been added to the subset of the plurality of consecutive content portions, the media guidance application may retrieve a first following content portion that immediately follows the respective content portion, and extract a second set of keywords from metadata corresponding to the first following content portion. The media guidance application may compare the first set of keywords corresponding to the respective content portion with the second set of keywords corresponding to the first following portion to determine a first overlap percentage between the first set of keywords and the second set of keywords. In response to determining that the first overlap percentage is lower than an overlap threshold, the media guidance application may refrain from identifying the first following content portion as closely related to the content segment. In response to determining that the first overlap percentage is higher than the overlap threshold, the media guidance application may add the first following content portion to the content segment, and may continue to retrieve a second following content portion that immediately follows the first following content portion. The media guidance application may then determine whether the second following content portion is closely related to the respective content portion in a similar manner. For example, the media guidance application may determine a second overlap percentage between the first set of keywords and a third set of keywords extracted from metadata corresponding to the second following content portion. In response to determining that the second overlap percentage is lower than the overlap threshold, the media guidance application may refrain from identifying the second following content portion as closely related to the content segment. In response to determining that the second overlap percentage is higher than the overlap threshold, the media guidance application may add the second following content portion to the content segment. The media guidance application may keep processing a following content portion to determine whether to include the following content portion into a content segment until the next content portion is determined to be not closely related to the respective content portion.

In some embodiments, the media guidance application may display content that is not included in the summary view in a side window in parallel to the summary view. For example, the media guidance application may identify a first missed content segment including one or more consecutive content portions that precede the earliest play position of the respective content segment and a second missed content segment including one or more consecutive content portions that follow the latest play position of the respective content portion. The media guidance application may determine a first duration corresponding to the respective content segment, a second duration corresponding to the first missed content segment and a third duration corresponding to the third missed content segment. The media guidance application may display, at a first rate, the respective content segment at a first window within the multi-window user interface, and display, at a second rate that is proportional to the first rate based on a ratio between the first duration and the second duration, the first missed content segment at a second window within the grid-based user interface screen. The media guidance application may display, at a third rate that is proportional to the first rate based on a ratio between the first duration and the third duration, the second missed content segment at a third window within the multiple-window user interface.

In some embodiments, in response to displaying the respective content segment at the first window, the media guidance application may determine that an event change is missed. For example, the media guidance application may determine a new character appears, or a change of scene has happened at the beginning of a content segment in the summary view. To detect the missed change, the media guidance application may retrieve a beginning content portion of the content segment, and extract a first set of keywords from metadata corresponding to the beginning content portion. The media guidance application may retrieve a preceding content segment from the summary view, which precedes the earliest play position of the content segment, and extract a second set of keywords from metadata corresponding to a last content portion of the preceding content segment. The media guidance application may then compare the first set of keywords and the second set of keywords to identify a subset of keywords from the first set of keywords that do not belong to the second set of keywords, e.g., new keywords that occur at the beginning of the content segment. The media guidance application may then query an event table based on the subset of keywords to determine whether there is a match. In response to determining a match between a keyword from the subset of keywords indicative of an event on the event table, the media guidance application may determine that an event change relating to the keyword has occurred between the last content portion and the beginning content portion, and determine that the event change occurred within the first missed content segment. For example, in a soccer game, the media guidance application may determine, from metadata corresponding to a content segment of the summary view, that the score of the game has changed, e.g., is different from the score shown in the last content segment. The media guidance application may determine that a goal has occurred during the skipped content between the current content segment and the last content segment.

In some embodiments, the media guidance application may analyze video frames to determine whether an event change has occurred. For example, the media guidance application may retrieve a beginning content portion of the content segment, and sample a first set of frames from the beginning content portion. The media guidance application may retrieve a preceding content segment from the summary view, which precedes the earliest play position of the content segment, and sample a second set of frames from a last content portion of the preceding content segment. The media guidance application may compare each respective frame from the first set of frames with the second set of frames based on pattern recognition to obtain a similarity level. In response to the comparison, the media guidance application may identify a subset of frames from the first set of frames, and each of the subset of frames corresponds to a similarity level as compared to the second set of frames, which is lower than a similarity threshold. For example, the subset of frames may indicate new scenery content that do not previously appear in the second set of frames. In response to identifying the subset of frames, the media guidance application may determine that an event change may likely has occurred between the last content portion and the beginning content portion.

In some embodiments, upon determining that an event change has occurred within the first missed content segment, the media guidance application may identify a catch-up point within the first missed content segment, e.g., the point where the event change occurred. For example, the media guidance application may determine a keyword that indicates the event change that may likely has happened, based on keywords that correspond to the first content portion of a content segment but do not correspond to the last content portion of the preceding content segment. Then, for each respective content portion that belongs to the first missed content segment between the content segment and the preceding content segment, the media guidance application may determine a respective set of keywords corresponding to the respective content portion, and compare the keyword with the respective set of keywords to identify when the keyword indicative of the event change first appears in any content portion during the first missed content segment. The media guidance application may identify an earliest content portion among respective content portions, in which the keyword (or the video frame that relates to the event change) appears for a first time, and identify the earliest play position of the earliest content portion as the catch-up point.

In some embodiments, the media guidance application may display the first missed content segment from the catch-up point at the second window.

In some embodiments, the media guidance application may display content in a fast-forward fashion such that the user may get a quick view of the media asset, and may obtain an estimate of the watch time of the summary view for the user. The media guidance application may receive a user indication to fast-forward displayed content to a time point at the third window, and identify a closest content portion, from the subset of the plurality of consecutive content portions, to the time point. The media guidance application may generate an estimated watch time for displayed content based on the remaining displayed content at the third window, and adjust remaining content portions, starting from the closest content portion, in the subset of the plurality of consecutive content portions, to fit the estimated watch time. The media guidance application may display the adjusted remaining content portions at the first window.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
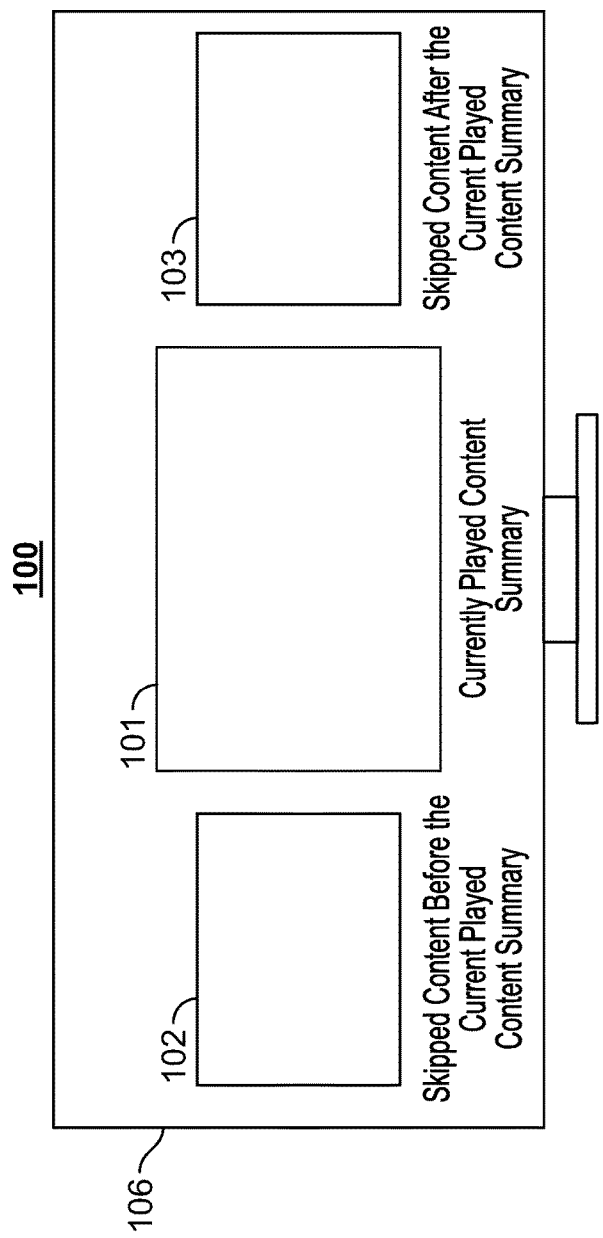
FIG. 1 depicts an illustrative diagram for providing an example user interface having a grid-based multi-window view for displaying summary content and skipped content simultaneously at a user equipment, in accordance with some embodiments of the disclosure.

Systems and methods are disclosed herein for automatically providing summarized views of a media asset in a multi-window user interface, including a center window that displays a summarized view of the media asset and a side window that displays skipped or missed content. As used herein, the term "summary view" is defined to mean a fraction of the media asset that is selected by the media guidance application to represent a summary of the media asset, and the "summary view" usually contains segments from the media asset that may not be continuous in time. As used herein, the term "skipped content" or "missed content" is defined to mean remainder of the media asset that is not included in the summary view, and the "skipped content" or "missed content" usually contains segments from the media assets between segments that are included in the summary view.

For example, a media guidance application may generate a summary view of a media asset, e.g., a reality television show, a soccer game, a tennis match, etc., by including important content portions in the summary view based on metadata (e.g., subtitle, etc.) of the content portion. For example, for a 60-minute-long episode of a television show, the media guidance application may generate a 15-minute long summary view.

The media guidance application may then display the summary view at a center window of a user equipment, and also display missed content in parallel at different windows of the same user equipment. For example, a left window at the user equipment may display missed content that happened before the currently displayed segment of the summary view, and a right window may display skipped content that may happen after the currently displayed segment of the summary view. In this way, a user watching the displayed content at the user equipment may be able to look at and absorb information from multiple windows when a user watches the summary view at a center window on the user equipment. The user may have the option to catch up on the skipped content and to obtain a forward preview of content that is going to happen simultaneously.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative diagram for providing an example user interface having a multi-window view for displaying summary content and skipped content simultaneously at a user equipment, in accordance with some embodiments of the disclosure. Diagram 100 shows user equipment 106, which has three windows 101-103 at a grid-based user interface. A center window 101 may display a content summary of a media asset, and the two side windows 102-103 may display skipped content that is not included in the content summary. For example, the side window 102 may be configured to display a content segment that is not part of the content summary but occurs before the currently displayed segment of the content summary, and the side window 103 may be configured to display a content segment that will be skipped after the currently displayed segment of the content summary. It is noted that the grid-based view of the user interface at user equipment 106 as shown in FIG. 1 is for illustrative purpose only. The multiple windows 101-103 may take any other form, shape and/or arrangement, such as but not limited to bubbles, cascades, stacks, and/or the like.

To display the summary content and/or the skipped content in the grid-view user interface 101-103, the media guidance application may obtain, from a media data source, a media asset. For example, the media guidance application, e.g., implemented on a set-top box, may receive a television program from a data source at a television network (e.g., data source 616 via communication network 614 as discussed in relation to FIG. 6), etc. The media guidance application may determine a plurality of consecutive content portions from the media asset. As used herein, "content portion" is defined to mean a unit of the media asset that has a pre-defined duration, which is usually less than a total duration of the media asset.

It is noted that FIG. 1 shows that the different windows 101-103 are implemented on a multi-screen user interface of the same user equipment 106 for illustrative purposes only. In another embodiment, the second window or the third window may be implemented on a different user device than user equipment 106. For example, the media guidance application may display the summary view at user equipment 106, and send the skipped content to a user mobile device for display simultaneously, or vice versa. The media guidance application may send the skipped content to the user mobile device in response to a user request, e.g., the user may want to view only the summary view only at user equipment 106, and receive the skipped content at the user mobile device. Embodiments described herein with respect to displaying the summary view and the skipped content at different windows are applicable to different scenarios when the different windows are implemented on the same user equipment, or at different user devices.

The media guidance application may define a content portion as a basic unit (e.g., see portion 211 shown in FIG. 2) for the media asset, the length of which is pre-determined based on the type of the media asset. For example, the media guidance application may determine a type of the media asset (e.g., a television show, a news program, a tennis match, a soccer game, etc.) based on metadata (e.g., title, genre, category, etc. of the media asset) associated with the media asset. The media guidance application may retrieve a pre-determined duration for a content portion corresponding to the type of the media asset, and then divide the media asset into the plurality of consecutive content portions (e.g., by tagging the media asset with a starting time and an ending time for each content portion), each of which has the pre-determined duration. For example, for a fast-paced television show where the scene may change every few seconds, the media guidance application may allocate ten seconds per content portion. For another example, for a tennis match where the back-and-forth change of scene between players may be relatively fast-paced, the media guidance application may allocate five seconds per content portion. For another example, for a soccer game where the change of scene is relatively slower than the tennis match as an organized offense in a soccer game may take longer than tennis or basketball, the media guidance application may allocate 20 seconds per content portion for the soccer game. Thus, the media asset may be viewed as a plurality of consecutive content portions.

Figure 2:
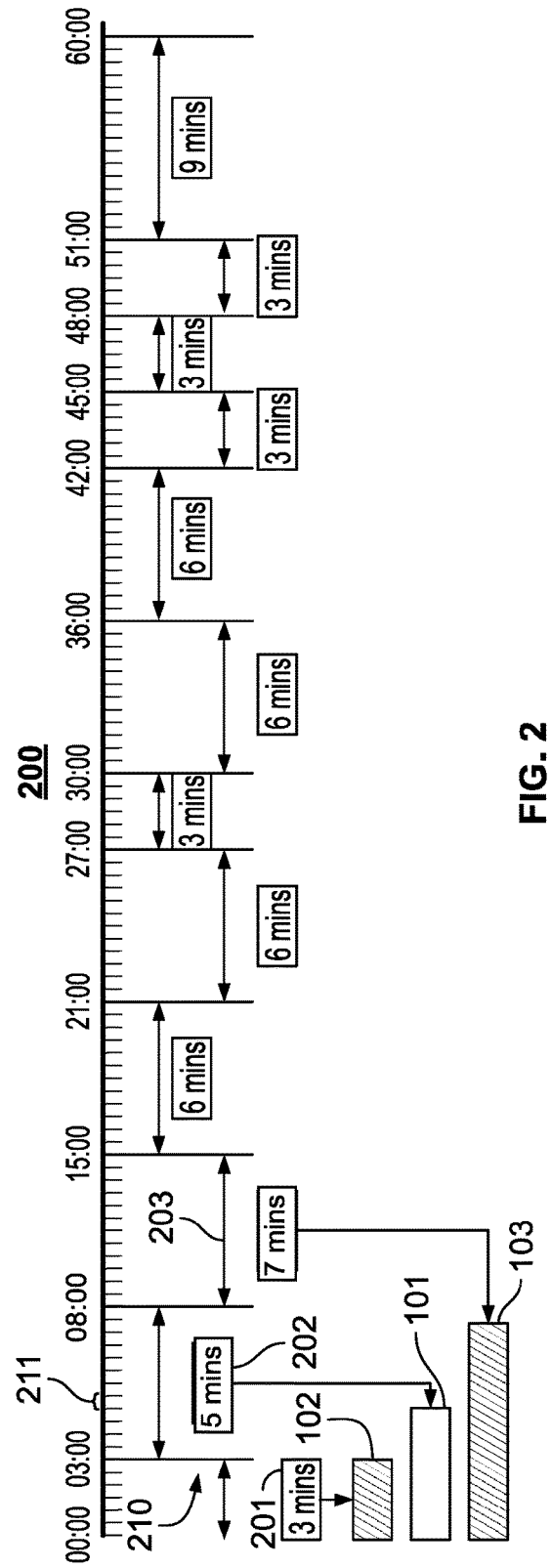
FIG. 2 depicts an illustrative diagram for a media asset being divided into the summary view content and skipped content, in accordance with some embodiments of the disclosure.

In some embodiments, the media guidance application may generate a summary view of the media asset including a subset of the plurality of consecutive content portions. FIG. 2 depicts an illustrative diagram for a media asset being divided into the summary view content and skipped content, in accordance with some embodiments of the disclosure. Block diagram 200 shows a media asset represented by the time axis 210. The media asset, represented by the time axis 210, may be divided into a plurality of content portions, e.g., see content portion 211. The media guidance application may identify a content segment including one or more consecutive content portions from the subset of the plurality of consecutive content portions. As used herein, a "content segment" is defined to mean a cluster of one or more consecutive content portions. For example, a summary view of the media asset usually contains one or more content segments, e.g., content segment 202 in FIG. 2. Similarly, the skipped content of the media asset usually contains one or more content segments as well, e.g., content segments 201 or 203. As shown in FIG. 2, content segments that belong to the summary view, e.g., segment 202, may be interleaved with content segments that are skipped, e.g., segments 201 and 203.

For example, the total duration of the media asset 210 is 60 minutes, but the media guidance application may need to build a content summary with a duration of 20 minutes. The center window 101 may be configured to display content from time "3:00" to "9:00" as part of the summary view. The side window 103 is configured to display a second segment starting from "15:00" to "21:00" as the skipped content.

To generate a summary view from the segments 201-203, the media guidance application may determine which content portions are to be included in the summary view, and which content portions are to be skipped. In some embodiments, the media guidance application may periodically sample content portions that form a fixed total length at a fixed time frame to be included in the summary view. For example, the media guidance application may periodically include content portions that last three minutes in total to form the segment 202 into the summary view, and periodically skip content portions that last six minutes in between the summary view segments.

In other embodiments, the media guidance application may determine whether a content portion is to be included in the summary view or to be skipped based on an importance of the content portion. For example, if the content portion includes a penalty goal in a soccer game, the media guidance application may determine the content portion as important and may include the content portion in the summary view. For each respective content portion from the plurality of consecutive content portions of the media asset, the media guidance application may determine an importance level of the respective content portion based at least in part on metadata (e.g., subtitle, etc.) corresponding to the respective content portion, and then determine whether the respective content portion is to be added to a summary content segment or is to be skipped. To determine the importance level of a respective content portion, the media guidance application may first retrieve the metadata file corresponding to the media asset and retrieve the value of the data field media_type, based on which the media guidance application may determine a type of the media asset, e.g., a soccer game, a tennis game, a reality show, a television drama, etc. The media guidance application may then retrieve an importance table based on the type of the media asset, and/or the title of the media asset, e.g., from storage 508 as discussed in relation to FIG. 5, or data source 618 via communications network 614 as discussed in relation to FIG. 6. Each importance table that corresponds to a specific type of the media asset may map a keyword indicative of an event that may occur within the media asset to a numeric score. For example, an importance table corresponding to a soccer game may take a form similar to:

TABLE 1

Example Importance Table for Soccer Games

| Keyword | Importance Score |
| --- | --- |
| penalty | 0.8 |
| goal | 0.8 |
| clear | 0.3 |
| corner kick | 0.6 |
| time-out | 0.1 |
| ... | ... |

As another example, an importance table corresponding to the television show "The Bachelor" may take a form similar to:

TABLE 2

Example Importance Table for "The Bachelor"

| Keyword | Importance Score |
| --- | --- |
| rose ceremony | 0.8 |
| one-on-one | 0.65 |
| group date | 0.55 |
| hometown | 0.55 |
| mansion | 0.3 |
| ... | ... |

It is worth noting that the above example importance tables as shown in Tables 1 and 2 are for illustrative purposes only, and the illustrative importance scores are normalized between 0 to 1. Other numeric values may be used for importance scores.

To determine an importance score of a respective content portion, the media guidance application may extract a first set of keywords from metadata corresponding to the respective content portion, and query the importance table based on the first set of keywords to obtain one or more importance scores corresponding to the first set of keywords. For example, if the media asset is a soccer game, the keywords extracted from a ten-second content portion may include "penalty," "off side," etc., and the media guidance application may obtain an importance score for each of the "penalty," "off side," etc., from an importance table similar to Table 1. The media guidance application may then assign an average value of the one or more importance scores to the importance level corresponding to the respective content portion.

In some embodiments, the media guidance application may determine the importance level of the respective content portion based on electronic communications that are indicative of user discussion of a live media asset, e.g., when the media asset is being broadcast in real time. For example, the media guidance application may obtain, during a period of time corresponding to the respective content portion, a plurality of publicly shared electronic communications by users, such as but not limited to social media posts, comments, likes, and/or the like. Each of the plurality of publicly shared electronic communications may includes an indicator (e.g., a hashtag) relating to the media asset. The media guidance application may then determine a subset of the plurality of publicly shared electronic communications that have one or more indicators corresponding to the one or more keywords, e.g., keywords extracted from metadata corresponding to the respective content portion. The media guidance application may then determine a ratio between a total count of the subset of the plurality of publicly shared electronic communications and a total count of the plurality of publicly shared electronic communications, and assign the ratio as the importance level. For example, the media guidance application may collect a total number of 10,000 social media posts that include the hashtag "# ChampionshipFinal" between the time 19:40 and 19:42, among which 9,432 posts include hashtags "# penalty," "# goal," "# realmadrid," and these hashtags correspond to keywords of a content portion that is broadcast during 19:40 and 19:42. Thus the respective two-minute long content portion has an importance level of 9432/10000. It is noted that the gathering and/or collection of publicly shared electronic communications and calculating the importance level based on the electronic communications may be performed by a remote server that is configured to communicate with the media guidance application.

In response to determining that the importance level is higher than an importance threshold, the media guidance application may add the respective content portion to the subset of the plurality of consecutive content portions as part of the summary view.

In some embodiments, the media guidance application may cluster content portions that closely relate to one another into a content segment to be included in the summary review. For example, if a content portion showing a penalty goal is selected as part of the summary view, the media guidance application may include the preceding content portion that includes the foul into the summary view as well, as the two content portions are closely related.

To determine whether an adjacent content portion is to be added to the summary review for a respective content portion that has been added to the subset of the plurality of consecutive content portions, the media guidance application may retrieve a first following content portion that immediately follows the respective content portion (e.g., from storage 508 as discussed in relation to FIG. 5, or data source 618 via communications network 614 as discussed in relation to FIG. 6), and extract a set of keywords from metadata corresponding to the first following content portion. The media guidance application may compare the first set of keywords corresponding to the respective content portion with the second set of keywords corresponding to the first following portion to determine a first overlap percentage between the first set of keywords and the second set of keywords. For example, if keywords from a respective content portion that has been added to the summary review include keywords such as "penalty," "goal," "real madrid," and/or the like, and the following content portion that follows the respective content portion includes keywords such as "penalty," "goal," "replay," etc., the two consecutive content portions share an overlap of keywords. In response to determining that the first overlap percentage is lower than an overlap threshold, the media guidance application may refrain from identifying the first following content portion as closely related to the content segment. In response to determining that the first overlap percentage is higher than the overlap threshold, the media guidance application may add the first following content portion to the content segment, and may continue to retrieve a second following content portion that immediately follows the first following content portion. The media guidance application may then determine whether the second following content portion is closely related to the respective content portion in a similar manner. For example, the media guidance application may determine a second overlap percentage between the first set of keywords and a third set of keywords extracted from metadata corresponding to the second following content portion. In response to determining that the second overlap percentage is lower than the overlap threshold, the media guidance application may refrain from identifying the second following content portion as closely related to the content segment. In response to determining that the second overlap percentage is higher than the overlap threshold, the media guidance application may add the second following content portion to the content segment. The media guidance application may keep processing a following content portion to determine whether to include the following content portion in a content segment until the next content portion is determined to be not closely related to the respective content portion. In this way, if a respective content portion includes content that relates to a "penalty kick," and the following one or more subsequent content portions may include a replay of the "penalty kick" in slow motion, the respective content portion and the following one or more content portions that are all related to the "penalty kick" may all be added to the summary review.

In some embodiments, after determining which content portions are to be included in the summary review and which content portions are to be skipped, the media guidance application may display the summary review at a center window (e.g., 101 in FIG. 1) of a multi-window user interface, and/or display content that is not included in the summary view in a side window (e.g., 102 or 103 in FIG. 1) in parallel to the summary view. The media guidance application may identify a first missed content segment that precedes the earliest play position of the respective content segment and a second missed content segment that follows the latest play position of the respective content portion. The media guidance application may determine a first duration corresponding to the respective content segment, a second duration corresponding to the first missed content segment and a third duration corresponding to the third missed content segment. The media guidance application may display, at a first rate, the respective content segment at a first window within the multi-window user interface, and display, at a second rate that is proportional to the first rate based on a ratio between the first duration and the second duration, the first missed content segment at a second window within the grid-based user interface screen. The media guidance application may display, at a third rate that is proportional to the first rate based on a ratio between the first duration and the third duration, the second missed content segment at a third window within the multiple-window user interface. For example, the media guidance application may display the summary view at the first window at the same frame rate that the media asset is to be played, e.g., 24 frames per second (fps). For another example, the media guidance application may display the summary view at a higher frame rate to shorten the display time, e.g., 48 fps, 60 fps, etc. As shown at the time axis 210 representing a media asset in FIG. 2, if the media guidance application skips contents from 00:00 to 03:00, and displays content from 03:00 to 08:00 as part of the summary view, and then again skips content from 08:00 to 15:00 again. When content segment 202 is being played, the media guidance application may display skipped content segment 201 from 00:00 to 03:00 on a side window to catch up the user with missed content, or display skipped content segment 203 from 08:00 to 15:00 at a side window to predict forward content. If content segment 202 is played at the frame rate of 24 bps, the skipped content segment 201 from 00:00 to 03:00 is to be displayed at a frame rate equivalent to 24 bps×3/5=14.4 bps, in synchronization with the summary view such that when the content segment from 03:00 to 08:00 for the summary view is finished, the catch-up content segment 201 from 00:00 to 03:00 is completed as well. Similarly, the skipped content segment 203 is played in synchronization with the content segment 202, at a frame rate equivalent to 24 bps×7/5=33.6 bps such that the forward content segment 203 from 08:00 to 15:00 is finished when the content segment 202 from 03:00 to 08:00 is finished.

In some embodiments, while displaying the generated summary view, the media guidance application may determine whether too much content has been skipped and whether catch-up content is necessary. In response to displaying the respective content segment at the first window, the media guidance application may determine whether an event change is missing. For example, if the summary view of a soccer game shows the score of the game has changed without showing an actual goal, the media guidance application may identify that too much content has been skipped. Similarly, if a new character appears, a change of scene has happened, and/or the like, at the beginning of a content segment in the summary view, the media guidance application may determine that a missed change has occurred.

To detect the missed change, the media guidance application may track the change of keywords of content segments included in the summary view. The media guidance application may retrieve the beginning content portion of the current content segment that is being played, and extract a first set of keywords from metadata corresponding to the beginning content portion. The media guidance application may retrieve a preceding content segment from the summary view that precedes the earliest play position of the content segment, and extract a second set of keywords from metadata corresponding to the last content portion of the preceding content segment. The media guidance application may then compare the first set of keywords and the second set of keywords to identify a subset of keywords from the first set of keywords that do not belong to the second set of keywords, e.g., new keywords that occur at the beginning of the current content segment. For example, if the beginning content portion of the current segment includes keywords that relate to the current score "1:0," while the last content portion of the preceding content segment includes keywords that relate to a score "0:0," the summary view may have skipped content portions that include a goal. The media guidance application may then query an event table based on the subset of keywords, e.g., "1:0," to determine whether there is a match. In response to determining a match between a keyword from the subset of keywords indicative of an event (e.g., score change, goal, etc.) on the event table, the media guidance application may determine that an event change relating to the keyword has occurred between the last content portion and the beginning content portion. The media guidance application may determine that the event change occurred within the first missed content segment. In the respective example when a keyword indicative of the current score has changed from "0:0" to "1:0," the media guidance application may determine that a goal has occurred during the skipped content between the current content segment and the last content segment.

In some embodiments, the media guidance application may analyze video frames to determine whether an event change has occurred. For example, the media guidance application may retrieve a beginning content portion of the content segment, and sample a first set of frames from the beginning content portion. The media guidance application may retrieve a preceding content segment from the summary view, which precedes the earliest position of the content segment, and sample a second set of frames from the last content portion of the preceding content segment. The media guidance application may compare each respective frame from the first set of frames with the second set of frames based on pattern recognition to obtain a similarity level. In response to the comparison, the media guidance application may identify a subset of frames from the first set of frames. Each of the subset of frames has a similarity level lower than a similarity threshold, as compared to any frame from the second set of frames, e.g., the subset of frames is indicative of possible new scenes that are not similar to scenes that have already appeared in the preceding segment. For example, when the last portion of the preceding segment includes frames showing a close-up view of the goal keeper at the gate, and the beginning portion of the current segment includes frames showing activities within the penalty area of the rivalry team, the media guidance application may determine that the beginning content portion of the current segment and the last content portion of the last segment have a changed scene. In response to identifying the subset of frames, the media guidance application may determine that an event change has occurred between the last content portion and the beginning content portion.

In some embodiments, upon determining that an event change has occurred within the first missed content segment (e.g., based on keywords comparison and/or frame comparison or both, etc.), the media guidance application may identify a catch-up point within the first missed content segment, e.g., the point where the event change may have occurred. For example, when the media guidance application has determined that a goal may have occurred during the missed segment, the media guidance application may identify a content portion within the missed segment showing that the goal may likely happen. For each respective content portion that belongs to the first missed content segment, the media guidance application may determine a respective set of keywords or frames corresponding to the respective content portion and comparing the keyword with the respective set of keywords. The media guidance application may identify an earliest content portion among respective content portions, in which the keyword (or the video frame that relates to the event change) appears for the first time, and identify the earliest content portion as the catch-up point. For example, the media guidance application may determine a content portion within the missed segment when the keywords "penalty," "goal," etc., appear for the first time, or a content portion within which the displayed score changed from "0:0" to "1:0" for the first time.

In some embodiments, upon identifying the catch-up point, the media guidance application may display the first missed content segment, starting from the catch-up point, at the second window. The media guidance application may optionally pause the summary view that is being played at the center window while the catch-up content is being played.

In some embodiments, the media guidance application may display content in a fast-forward fashion such that the user may get a quick view of the media asset, and may obtain an estimate of watch time of the summary view for the user. For example, if the user has limited time to watch the summary view that is being played at the center window, the media guidance application may dynamically rebuild the rest of the summary view such that the summary view may be completed in a fixed time. The media guidance application may receive a user indication to fast-forward displayed content to a time point at a side window, e.g., when the user is interested in having a quick view of what is ahead in the media asset. The media guidance application may identify a content portion that the time point belongs to, and identify the closest content portion within the summary view to the time point. The media guidance application may generate an estimated watch time for displayed content based on the remaining displayed content at the side window, and adjust remaining content portions, starting from the closest content portion, in the subset of the plurality of consecutive content portions to fit the estimated watch time. For example, if the user has fast-forwarded the content on the side window to two minutes before the end, while the summary view has four minutes left, the media guidance application may jump to the content portion in the summary view that is the closest to the time point that the user has fast forwarded to. Alternatively, the media guidance application may skip content of the next two minutes in the summary view. Alternatively, the media guidance application may play the remaining four-minute content at a faster rate such that the summary view can be completed within two minutes.

Figure 3:
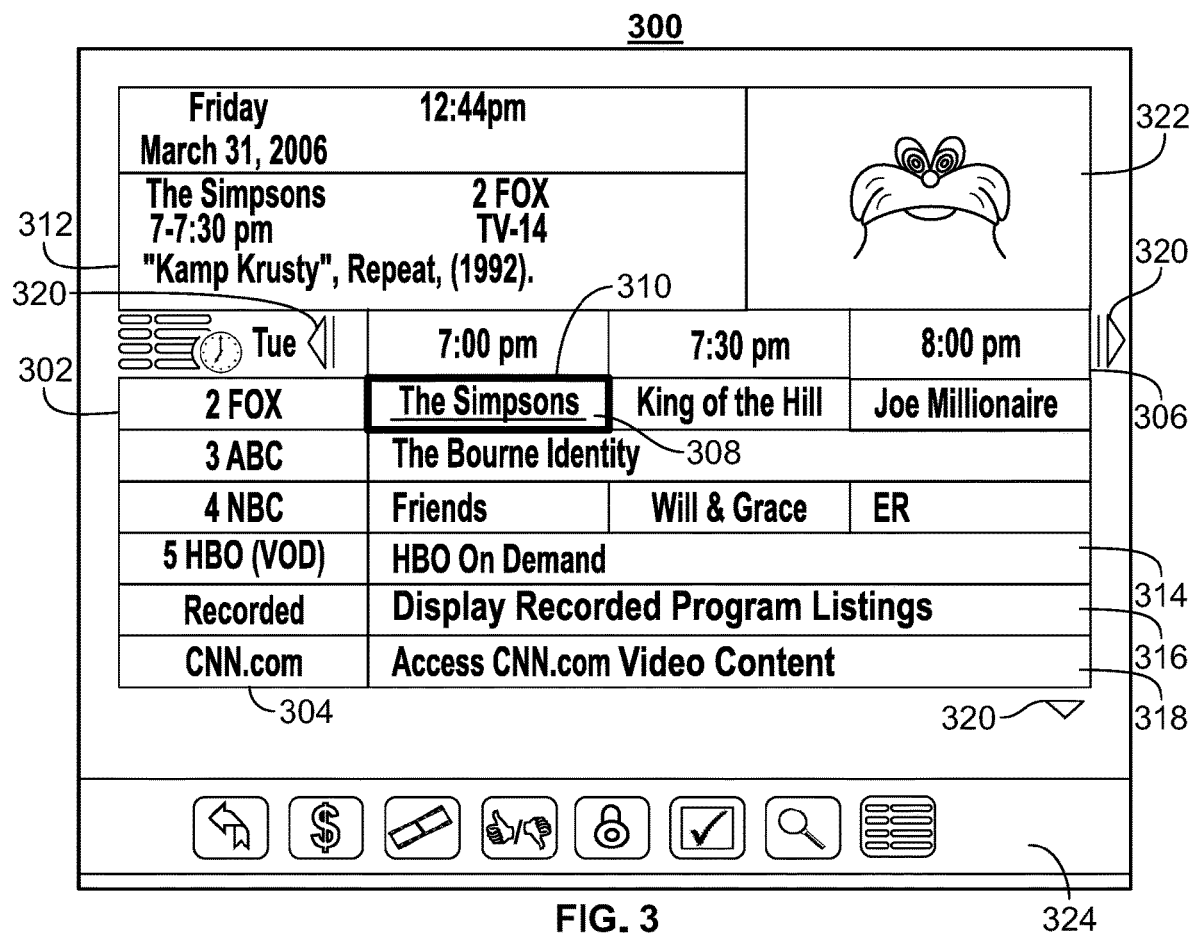
FIG. 3 shows an illustrative embodiment of a display screen that may be used to provide media guidance application listings and other media guidance information, in accordance with some embodiments of the disclosure.
Figure 4:
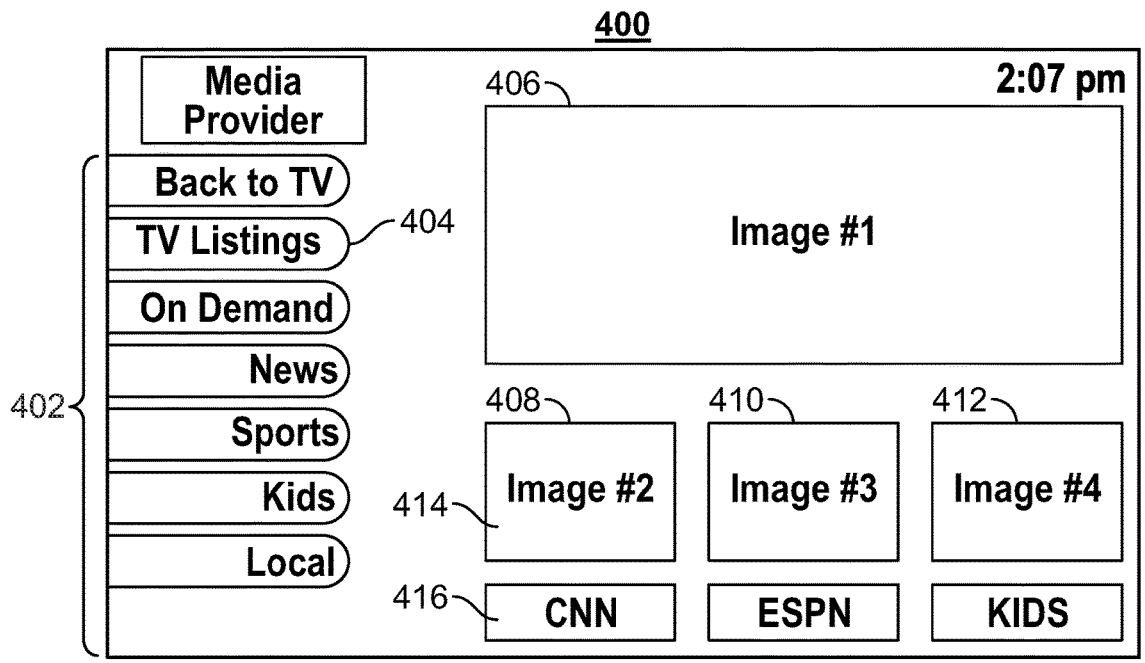
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 3003 and Yuen et al. U.S. Pat. No. 6,239,794, issued May 39, 3001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 3005/0251827, filed Jul. 11, 3005, Boyer et al., U.S. Pat. No. 7,165,098, issued Jan. 16, 3007, and Ellis et al., U.S. Patent Application Publication No. 3002/0174430, filed Feb. 31, 3002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
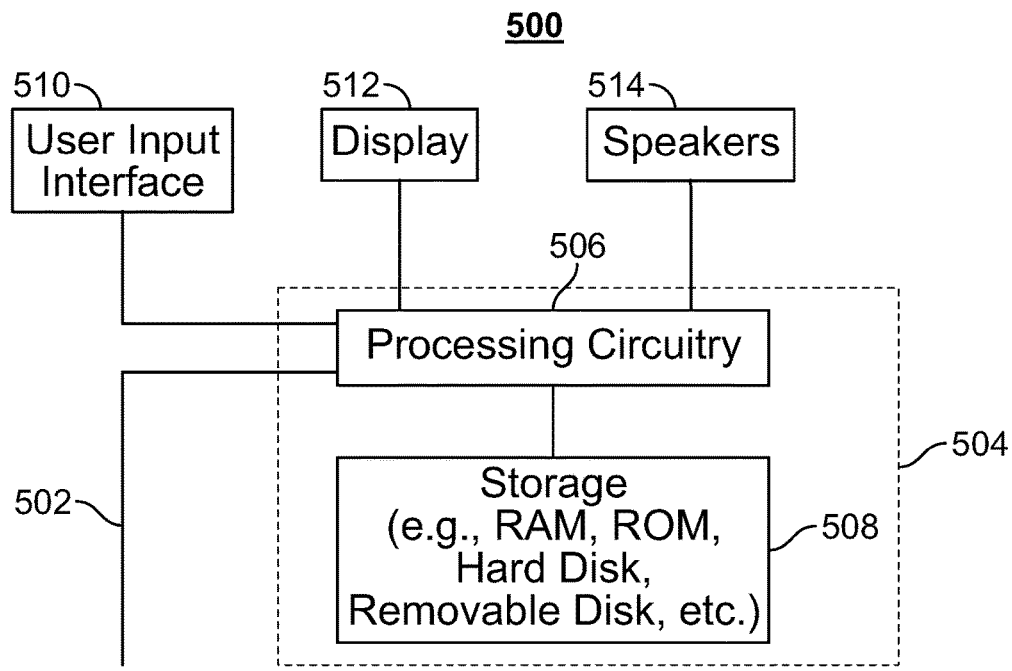
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 500 of FIG. 5 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

Figure 6:
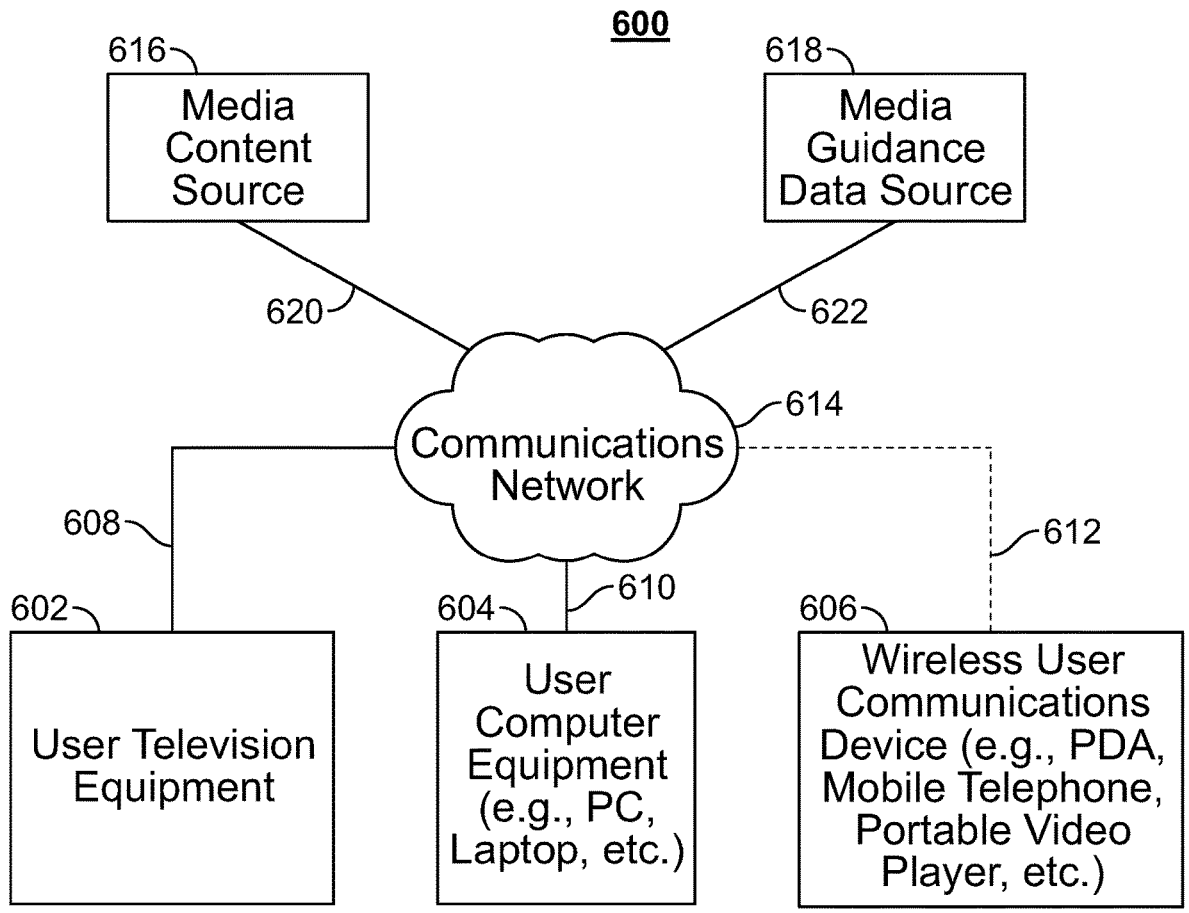
FIG. 6 is a block diagram of an illustrative media system in accordance with some embodiments of the disclosure.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 7:
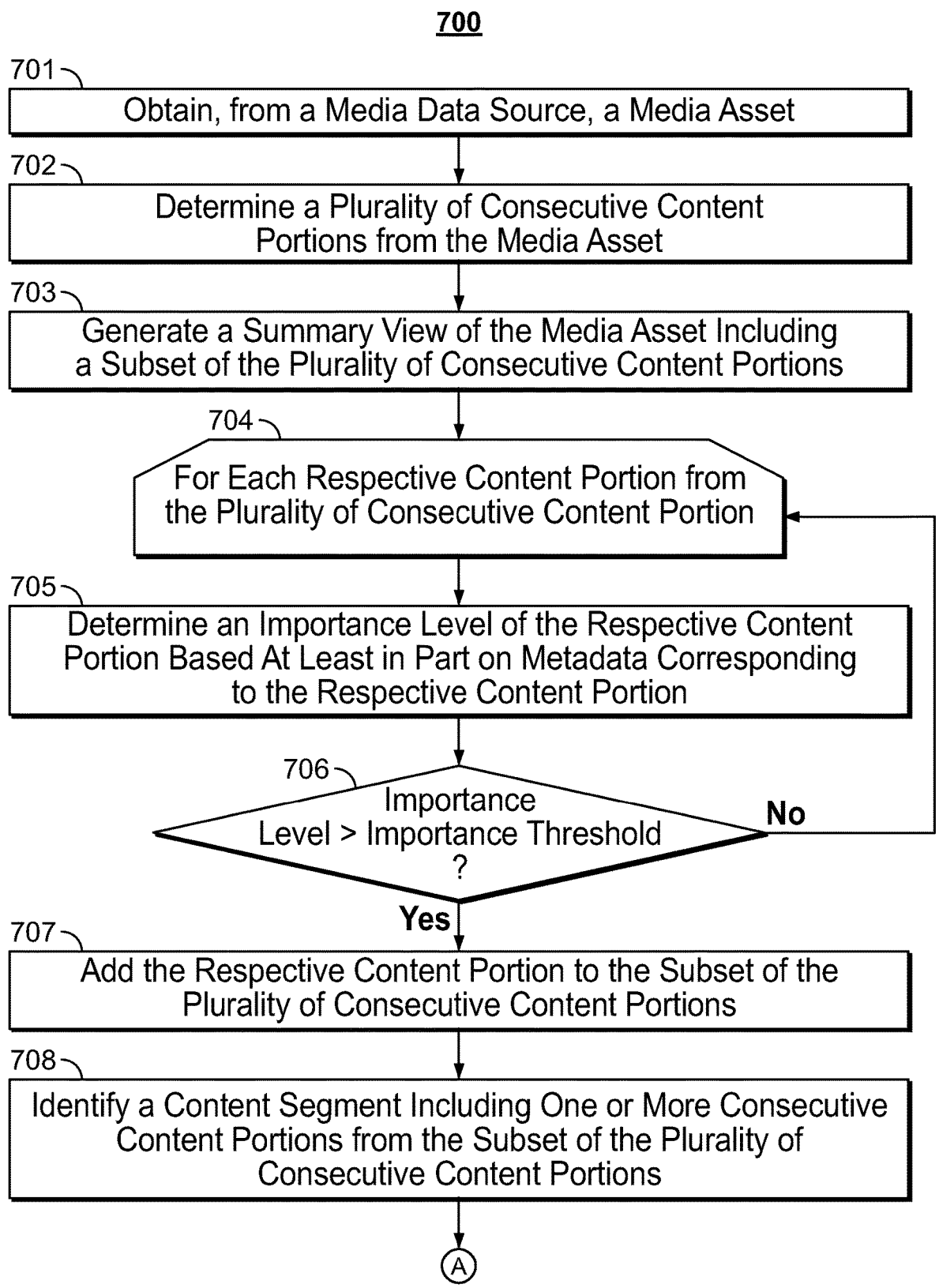
FIG. 7 depicts an illustrative flowchart of a process for playing summarized views of a media asset in a multi-window user interface, in accordance with some embodiments of the disclosure.
Figure 7:
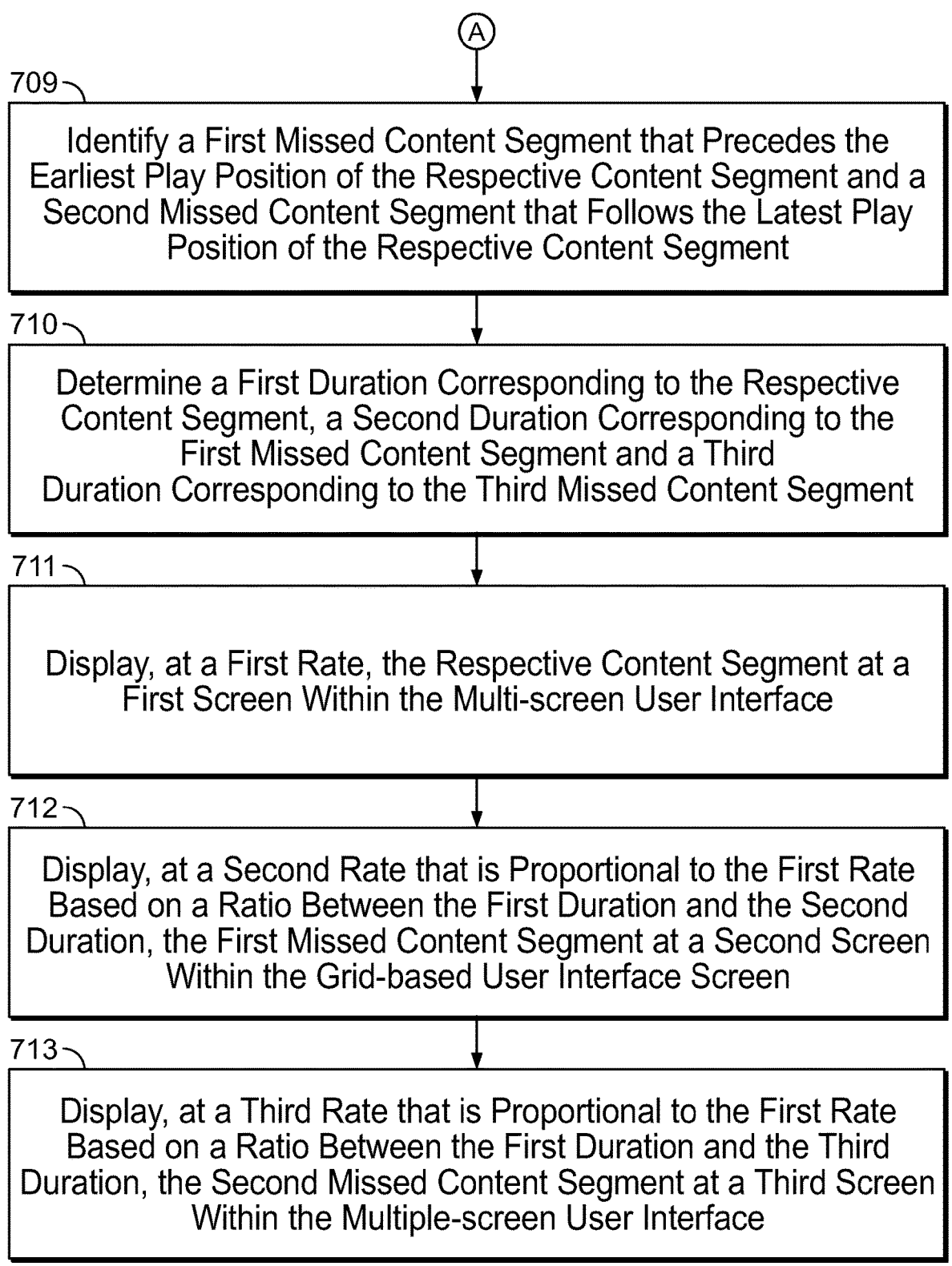

FIG. 7 depicts an illustrative flowchart of a process for playing summarized views of a media asset in a multi-screen user interface, in accordance with some embodiments of the disclosure. Process 700 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 700 begins at 701, where control circuitry 504 obtains, from a media data source (e.g., data source 516 in FIG. 6), a media asset. At 702, control circuitry 504 determines a plurality of consecutive content portions from the media asset. At 703, control circuitry 504 generates a summary view of the media asset including a subset of the plurality of consecutive content portions, which may be stored at memory at storage 508 in FIG. 5, or remotely at data source 618 via communications network 614 in FIG. 6. For each respective content portion from the plurality of consecutive content portion at 704, control circuitry 504 determines an importance level of the respective content portion based at least in part on metadata corresponding to the respective content portion, at 705, which is described in further detail in relation to FIG. 11 in one embodiment. At 706, if the importance level is greater than the importance threshold, process 700 continues to 707, where control circuitry 504 adds the respective content portion to the subset of the plurality of consecutive content portions. At 706, if the importance level is not greater than the importance threshold, process 700 continues with 704. For example, different importance levels corresponding to metadata in different types of media assets are discussed in connection with Tables 1-2.

Process 700 continues with 708, where control circuitry 504 identifies a content segment (e.g., see content segment 202 in FIG. 2) including one or more consecutive content portions from the subset of the plurality of consecutive content portions (e.g., see content portion 211 in FIG. 2). At

Figure 12:
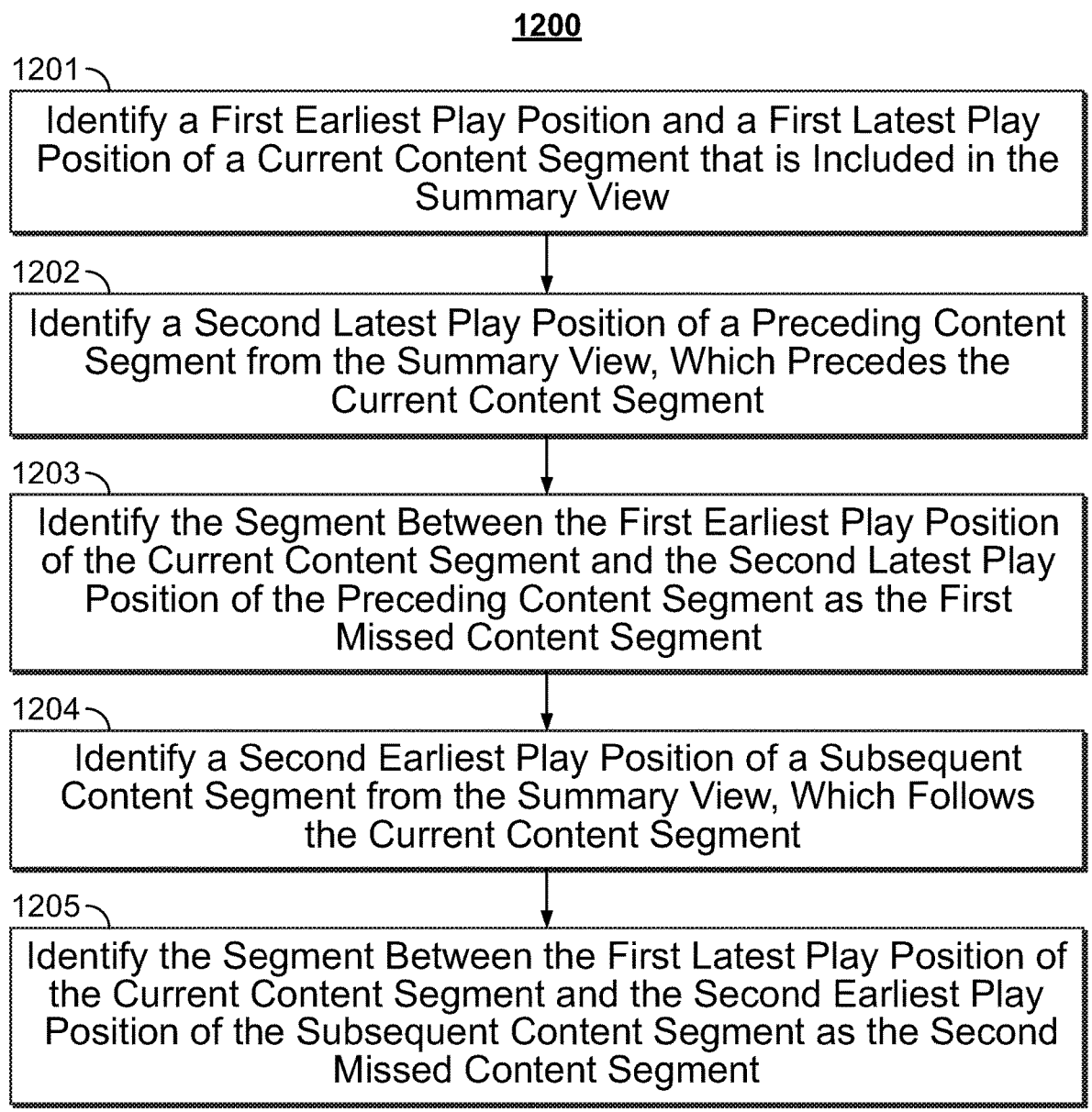
FIG. 12 depicts an illustrative flowchart of a process for determining an importance level of a content portion based at least in part on metadata corresponding to the content portion, in accordance with alternative embodiments of the disclosure.

709, control circuitry 504 identifies a first missed content segment (e.g., see content segment 201 in FIG. 2) including one or more consecutive content portions that immediately precede the respective content segment and a second missed content segment (e.g., see content segment 203 in FIG. 2) including one or more consecutive content portions that immediately follow the respective content portion, which is described in further detail in relation to FIG. 12 in one embodiment. At 710, control circuitry 504 determines a first duration corresponding to the respective content segment, a second duration corresponding to the first missed content segment and a third duration corresponding to the third missed content segment. For example, the duration of each content segments 201-203 is determined as discussed in relation to FIG. 12.

Process 700 continues with 711, where control circuitry 504 displays, at a first rate, the respective content segment at a first window (e.g., 101 in FIG. 1) within the multi-screen user interface, e.g., on user equipment 106 in FIG. 1, and/or via the display 312 in FIG. 3, or any of 602, 604 and 606 in FIG. 6. At 712, control circuitry 504 displays, at a second rate that is proportional to the first rate based on a ratio between the first duration and the second duration, the first missed content segment at a second window (e.g., 102 in FIG. 1) within the user interface screen, e.g., on user equipment 106 in FIG. 1, and/or via the display 312 in FIG. 3, or any of 602, 604 and 606 in FIG. 6. At 713, control circuitry 504 displays, at a third rate that is proportional to the first rate based on a ratio between the first duration and the third duration, the second missed content segment at a third window (e.g., 103 in FIG. 1) within the multiple-screen user interface, e.g., on user equipment 106 in FIG. 1, and/or via the display 312 in FIG. 3, or any of 602, 604 and 606 in FIG. 6. Embodiments of displaying content segments at different display windows are further discussed in relation to FIG. 13.

Figure 8:
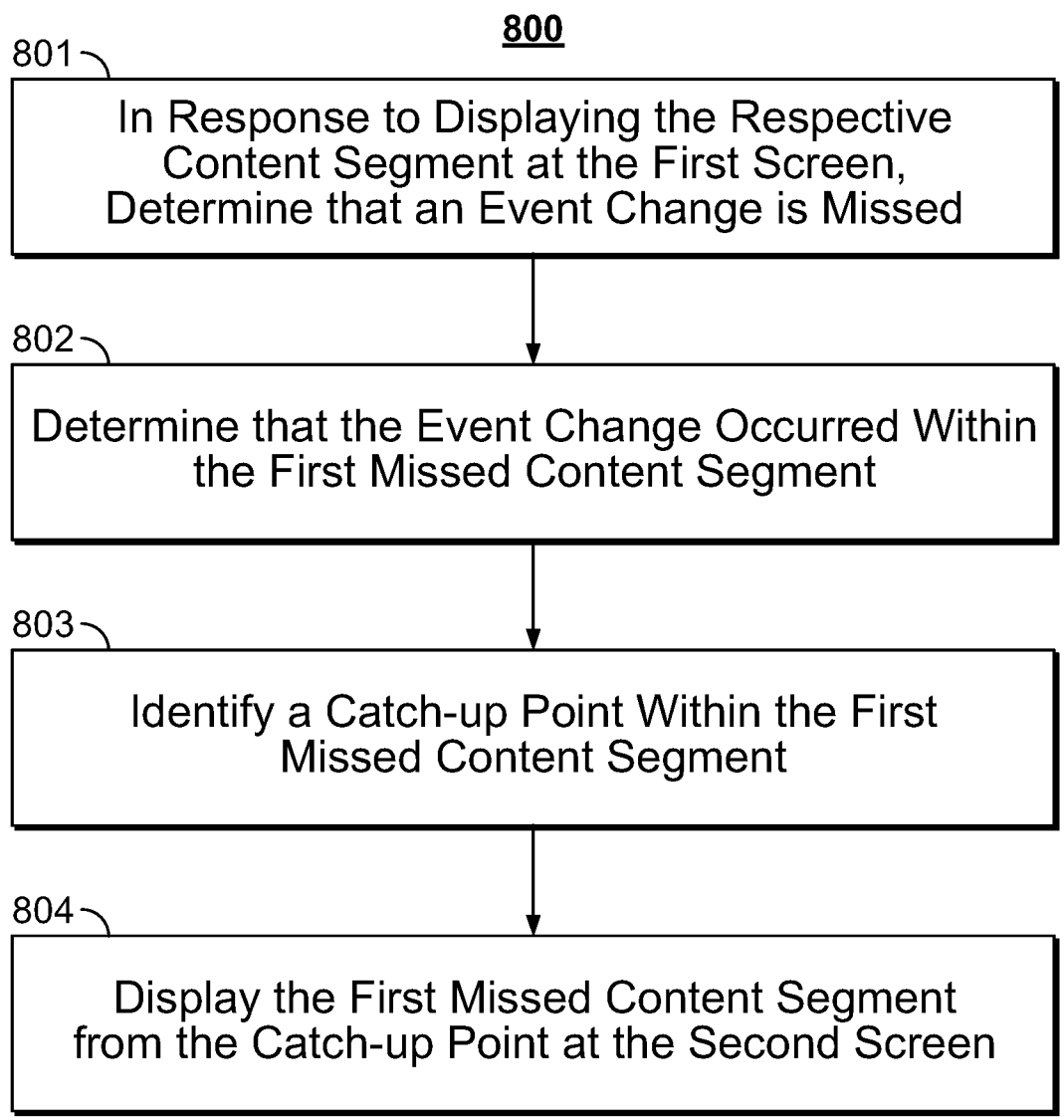
FIG. 8 depicts an illustrative flowchart of a process for playing content that is missing from the summary view of a media asset, in accordance with some embodiments of the disclosure.

FIG. 8 depicts an illustrative flowchart of a process for playing content that is missed from the summary view of a media asset, in accordance with some embodiments of the disclosure. Process 800 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 800 begins at 801, where control circuitry 504, in response to displaying the respective content segment of a summary view at the first screen (e.g., 101 in FIG. 1), determines that an event change is missed. At 802, control circuitry 504 determines that the event change occurred within the first missed content segment. At 803, control circuitry 504 identifies a catch-up point within the first missed content segment. At 804, control circuitry 504 displays the first missed content segment from the catch-up point at the second screen, e.g., screen 102 in FIG. 1. For example, embodiments of determining an event change and the catch-up point are described in relation to FIGS. 9-10.

Figure 9:
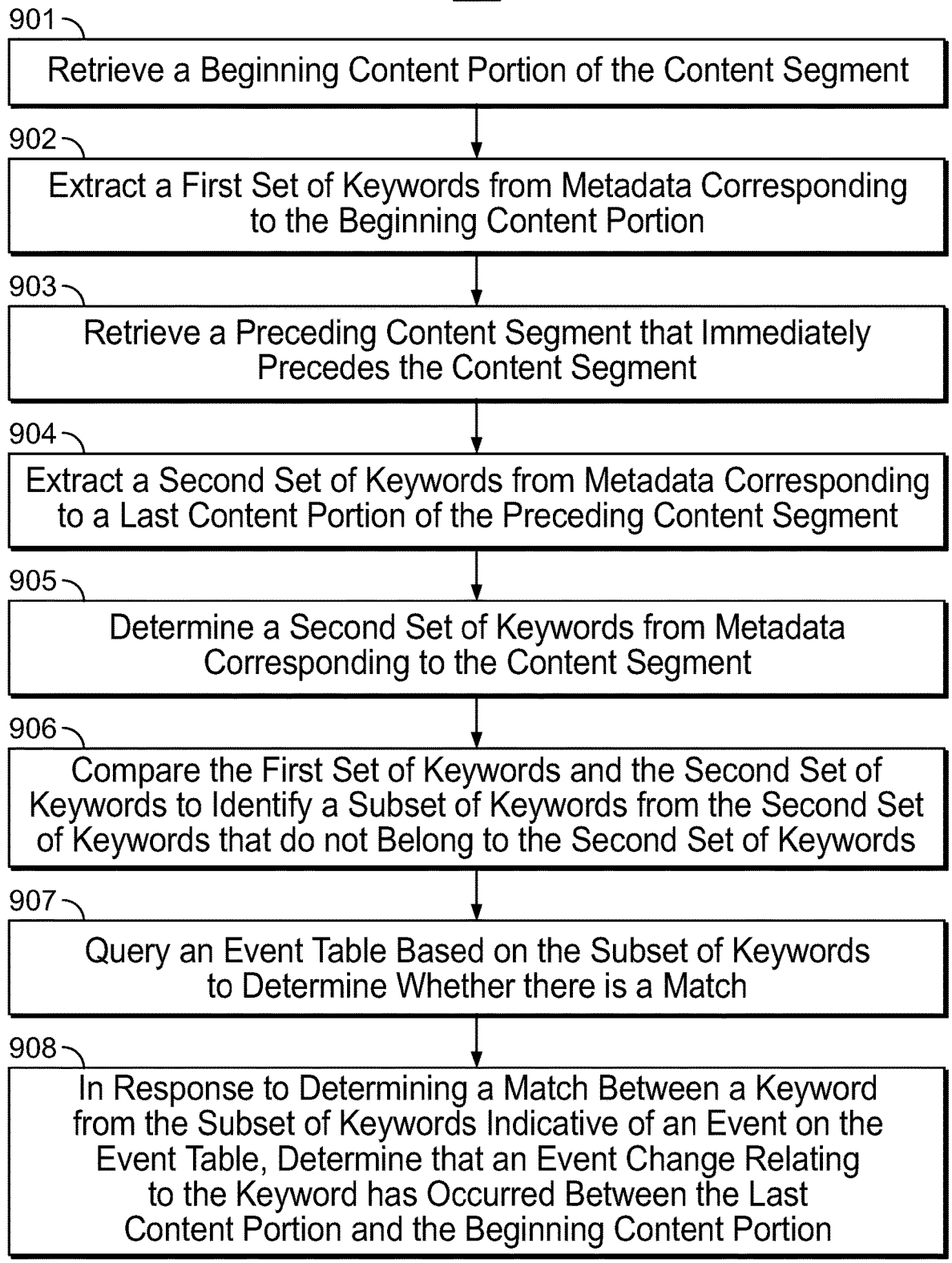
FIG. 9 depicts an illustrative flowchart of a process for determining whether an event change is missing from the summary view based on metadata of the media asset, in accordance with some embodiments of the disclosure.

FIG. 9 depicts an illustrative flowchart of a process for determining whether an event change has been missed from the summary view based on metadata of the media asset (e.g., see 802 in FIG. 8), in accordance with some embodiments of the disclosure. Process 900 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 900 begins at 901, where control circuitry 504 retrieves a beginning content portion of the content segment, e.g., from storage 508 in FIG. 5. At 902, control circuitry 504 extracts a first set of keywords from metadata corresponding to the beginning content portion. For example, as discussed in relation to FIG. 2, for a summary view of a soccer game, the beginning content portion may include keywords such as "1:0," "goal," and/or the like. At 903, control circuitry 504 retrieves a preceding content segment from the summary view and the preceding content segment that precedes the content segment in the summary view. At 904, control circuitry 504 extracts a second set of keywords from metadata corresponding to a last content portion of the preceding content segment. For example, the last content portion of the preceding content segment may include keywords such as "0:0," "defense," etc. At 905, control circuitry 504 determines a second set of keywords from metadata corresponding to the content segment. At 906, control circuitry 504 compares the first set of keywords and the second set of keywords to identify a subset of keywords from the second set of keywords that do not belong to the second set of keywords. For example, the beginning content portion of the content segment may contain a keyword "1:0" that does not appear in the last content portion of the preceding content segment. At 907, control circuitry 504 queries an event table based on the subset of keywords to determine whether there is a match. For example, the keyword "1:0" may correspond to an event match of "goal," "score," etc. At 908, in response to determining a match between a keyword from the subset of keywords indicative of an event on the event table, control circuitry 504 determines that an event change relating to the keyword has occurred between the last content portion and the beginning content portion. For example, the control circuitry may determine that a goal has occurred during the missed content between the last content portion and the beginning content portion.

Figure 10:
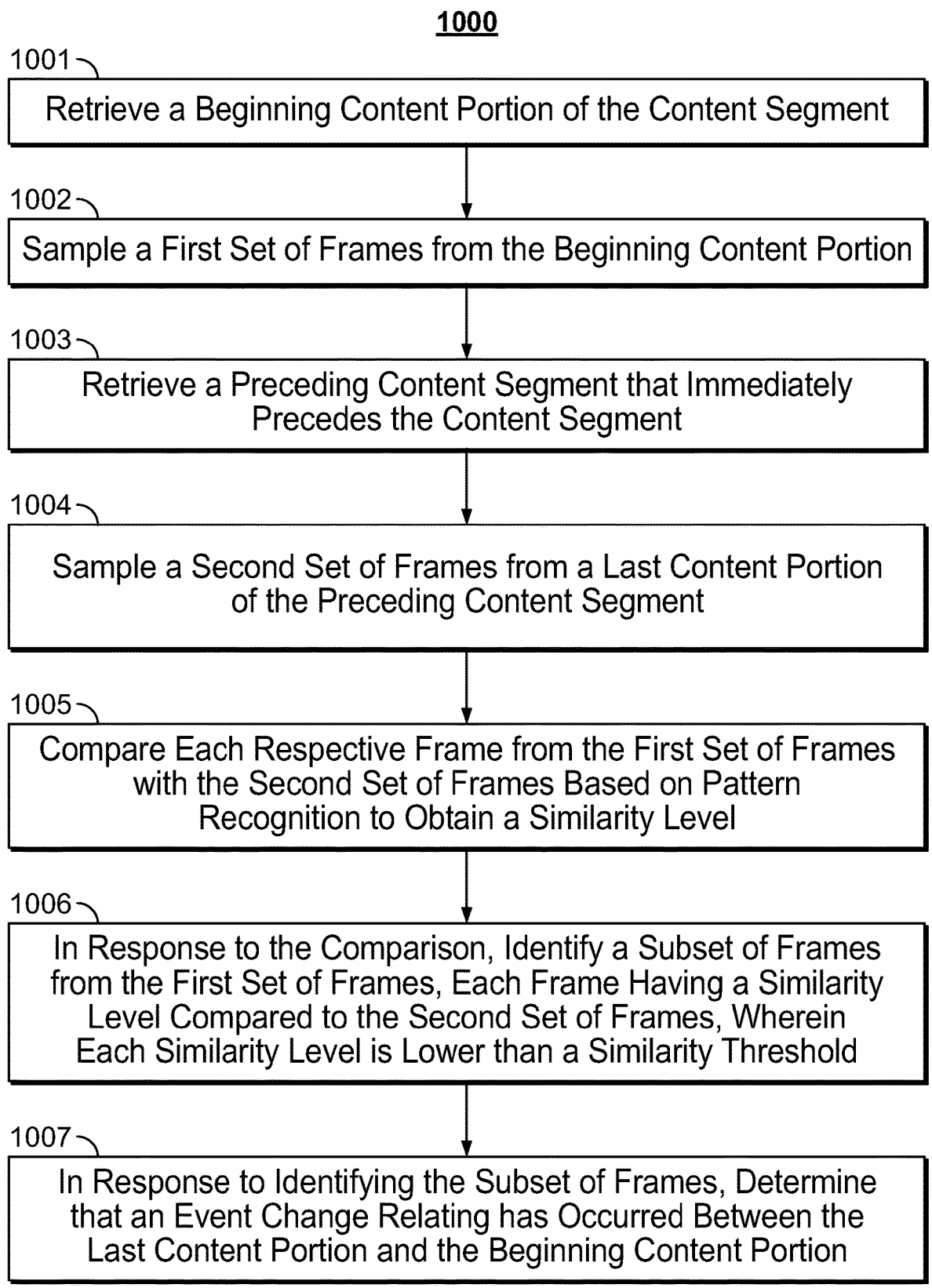
FIG. 10 depicts an illustrative flowchart of a process for determining whether an event change is missing from the summary view based on video frames of the media asset, in accordance with some embodiments of the disclosure.

FIG. 10 depicts an illustrative flowchart of a process for determining whether an event change has been missed from the summary view based on video frames of the media asset (e.g., 802 in FIG. 8), in accordance with some embodiments of the disclosure. Process 1000 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1000 begins at 1001, where control circuitry 504 retrieves a beginning content portion of the content segment, e.g., from storage 508 in FIG. 5 or from data source 616 via communications network 614 in FIG. 6. At 1002, control circuitry 504 retrieves a beginning content portion of the content segment. At 1003, control circuitry 504 samples a first set of frames from the beginning content portion. For example, frames from the beginning of the currently displayed content segment may show a displayed score of "1:0." At 1004, control circuitry 504 retrieving a preceding content segment that immediately precedes the content segment, e.g., from storage 508 in FIG. 5 or from data source 616 via communications network 614 in FIG. 6. At 1005, control circuitry 504 samples a second set of frames from a last content portion of the preceding content segment. For example, frames from the last content segment may show a displayed score of "0:0." At 1006, control circuitry 504 compares each respective frame from the first set of frames with the second set of frames based on pattern recognition to obtain a similarity level. At 1006, in response to the comparison, control circuitry 504 identifies a subset of frames from the first set of frames, each frame having a similarity level compared to the second set of frames, where each similarity level is lower than a similarity threshold. At 1007, in response to identifying the subset of frames, control circuitry 504 determines that an event change relating has occurred between the last content portion and the beginning content portion. For example, the control circuitry 504 may identify the changed displayed scores from "0:0" to "1:0" in the frames, and then determine that a goal has occurred within the missed segment between the last content segment and the currently displayed content segment.

Figure 11:
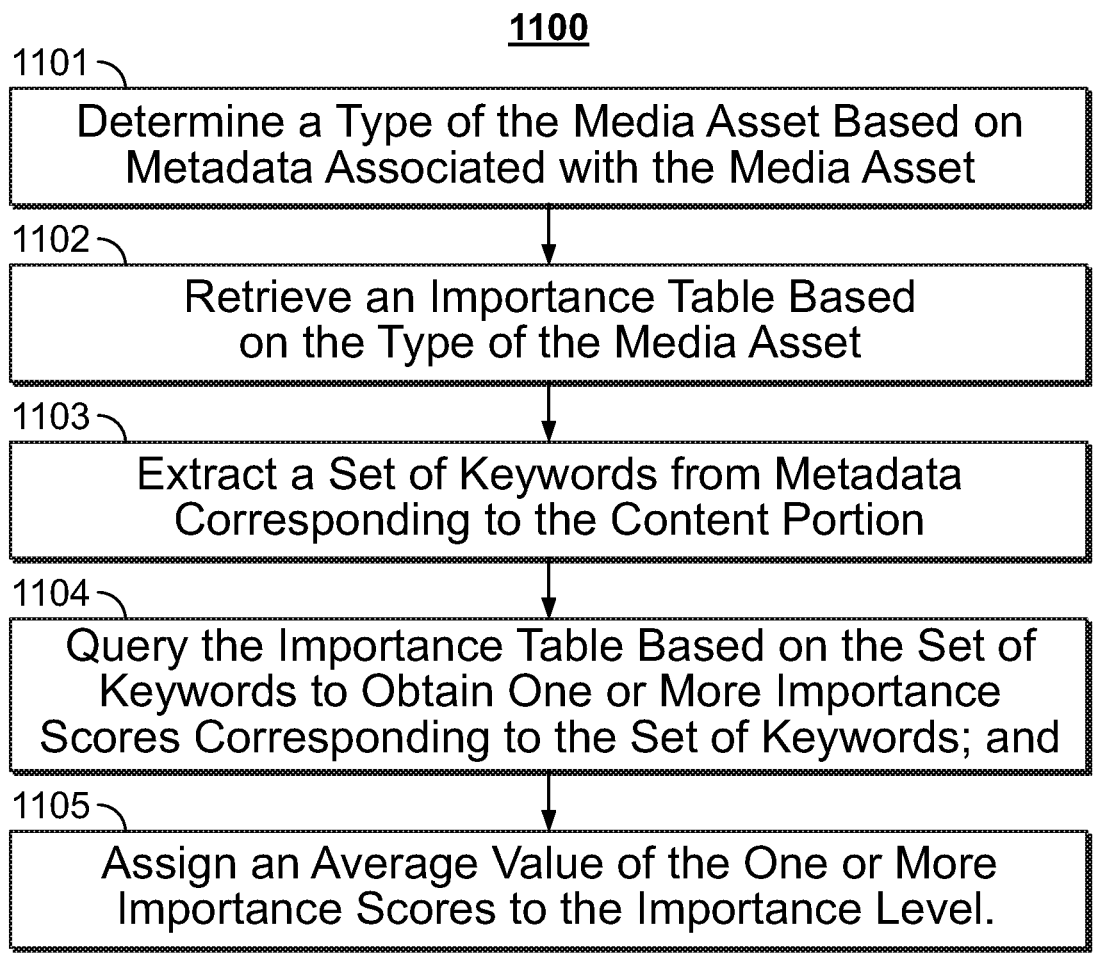
FIG. 11 depicts an illustrative flowchart of a process for determining an importance level of a content portion based at least in part on metadata corresponding to the content portion, in accordance with alternative embodiments of the disclosure.

FIG. 11 depicts an illustrative flowchart of a process for determining an importance level of a content portion based at least in part on metadata corresponding to the content portion (e.g., 705 in FIG. 7), in accordance with alternative embodiments of the disclosure. Process 1100 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1100 begins at 1101, where control circuitry 504 determines a type of the media asset based on metadata associated with the media asset. At 1102, control circuitry 504 retrieves an importance table based on the type of the media asset. For example, Tables 1-2 provide different examples of importance tables for different types of media asset, e.g., a soccer game, a television show, etc. At 1103, control circuitry 504 extracts a set of keywords from metadata corresponding to the content portion. For example, keywords corresponding to a content portion of a soccer game may include "goal," "penalty," "foul," etc. At 1104, control circuitry 504 queries the importance table based on the set of keywords to obtain one or more importance scores corresponding to the set of keywords. At 1105, control circuitry 504 assigns an average value of the one or more importance scores to the importance level. For example, the importance score corresponding to each of the keyword "goal," "penalty," "foul," etc. is retrieved from Table 1, and an average of the retrieved importance scores is calculated.

FIG. 12 depicts an illustrative flowchart of a process for determining an importance level of a content portion based at least in part on metadata corresponding to the content portion (e.g., 709 in FIG. 7), in accordance with alternative embodiments of the disclosure. Process 1200 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1200 begins at 1201, where control circuitry 504 identifies a first earliest play position (e.g., "03:00" for segment 202 in FIG. 2) and a first latest play position (e.g., "09:00" for segment 202 in FIG. 2) of a current content segment that is included in the summary view. At 1202, control circuitry 504 identifies a second latest play position (e.g., "00:00" in FIG. 2) of a preceding content segment from the summary view, which precedes the current content segment. At 1203, control circuitry 504 identifies the segment between the first earliest play position of the current content segment and the second latest play position of the preceding content segment as the first missed content segment (e.g., segment 201 in FIG. 2). At 1204, control circuitry 504 identifies a second earliest play position (e.g., "15:00" in FIG. 2) of a subsequent content segment from the summary view, which follows the current content segment. At 1205, control circuitry 504 identifies the segment between the first latest play position of the current content segment and the second earliest play position of the subsequent content segment as the second missed content segment (e.g., segment 202 in FIG. 2).

Figure 13:
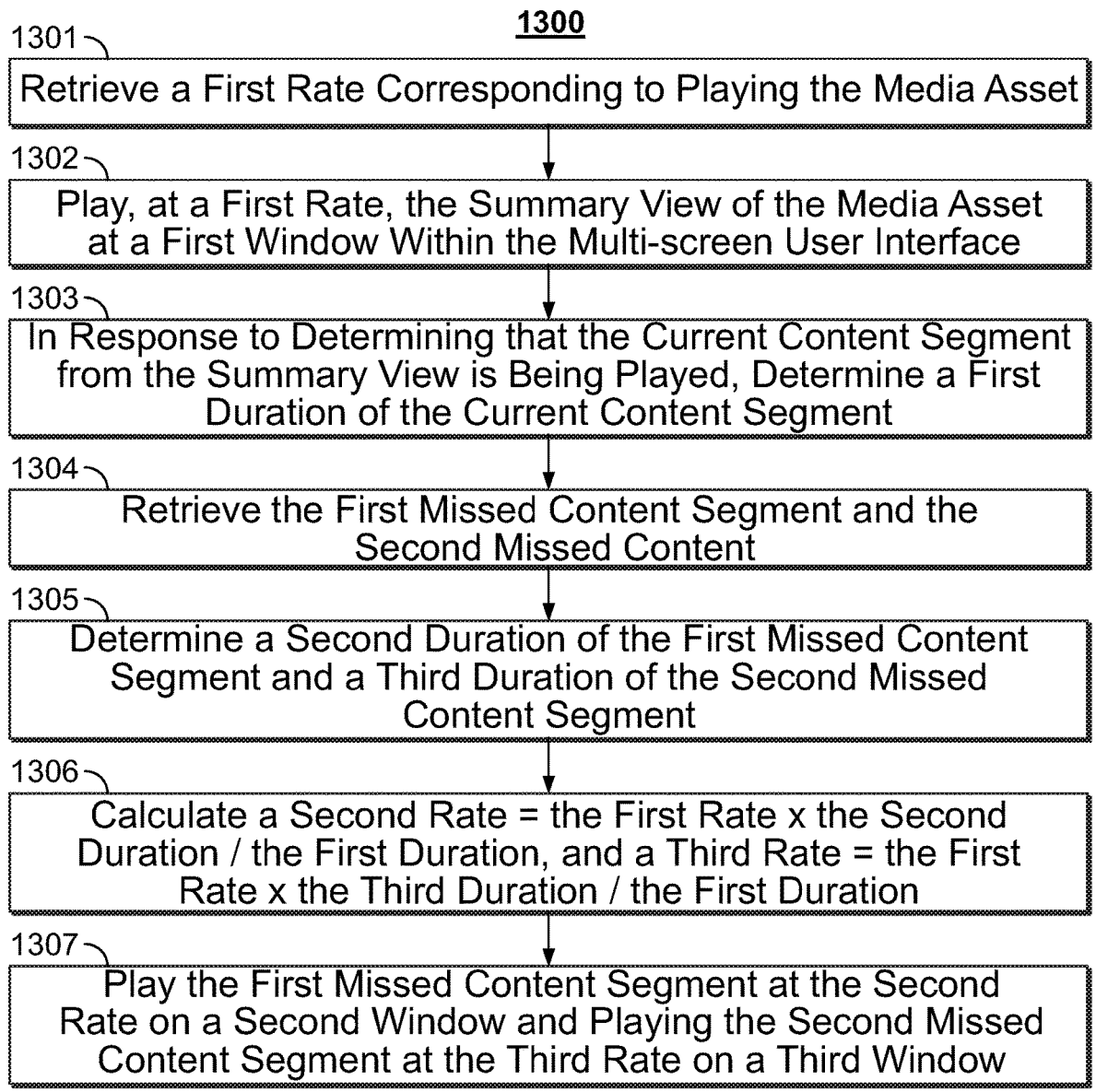
FIG. 13 depicts an illustrative flowchart of a process for determining an importance level of a content portion based at least in part on metadata corresponding to the content portion, in accordance with alternative embodiments of the disclosure.

FIG. 13 depicts an illustrative flowchart of a process for determining an importance level of a content portion based at least in part on metadata corresponding to the content portion (e.g., 709 in FIG. 7), in accordance with alternative embodiments of the disclosure. Process 1200 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1300 begins at 1301, where control circuitry 504 retrieves a first rate corresponding to playing the media asset. For example, control circuitry 504 retrieves the rate to play the media asset from metadata corresponding to the media asset. At 1302, control circuitry 504 plays, at the first rate, the summary view of the media asset at a first window (e.g., window 101 in FIG. 1) within the multi-screen user interface. At 1303, control circuitry 504 determines when the current content segment (e.g., 202 in FIG. 2) is being played, and in response to determining that the current content segment from the summary view is being played, determining a first duration of the current content segment. For example, control circuitry 504 reads the earliest play position and the last play position of the current content segment, and determines the duration for segment 202 in FIG. 2 is five minutes. At 1304, control circuitry 504 retrieves the first missed content segment (e.g., 201 in FIG. 2) and the second missed content segment (e.g., 202 in FIG. 2). For example, the first missed content segment and the second missed content segment are determined by process 1200 in relation to FIG. 12. At 1305, control circuitry 504 determines a second duration of the first missed content segment and a third duration of the second missed content segment. For example, similarly, control circuitry 504 retrieves the earliest play position and the latest play position of each content segment, and determines the second duration of five minutes for the first missed content segment 201 and the third duration of seven minutes for the second missed content segment 203 in relation to FIG. 2. At 1306, control circuitry 504 calculates a second rate as the first rate times the ratio between the second duration and the first duration, and a third rate as the first rate times the ratio between the third duration and the first duration. For example, the calculation of frame rates for playing content segments 201 and 203 in synchronization with content segment 202 is described in relation to FIG. 2.

Figure 14:
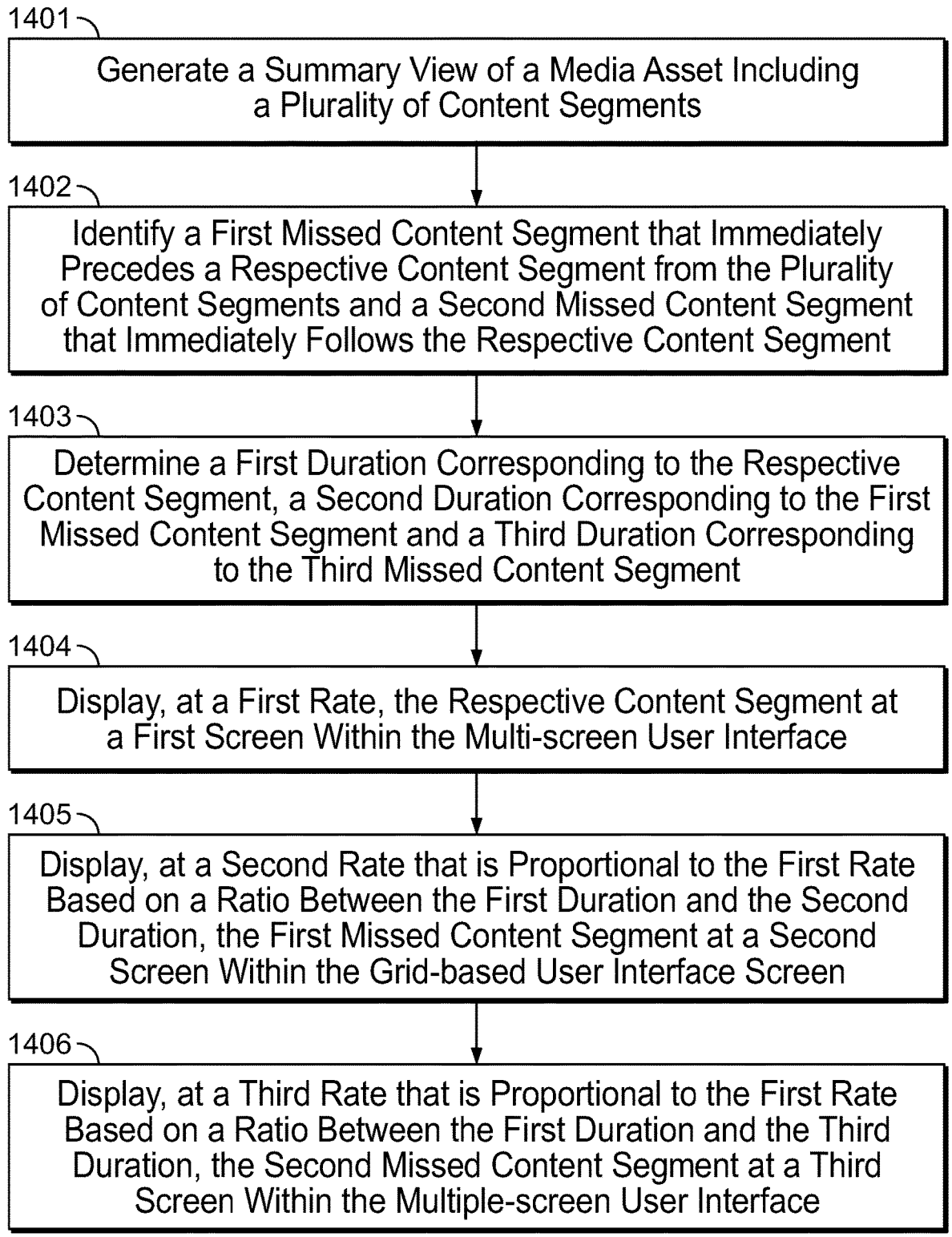
FIG. 14 depicts an illustrative flowchart of a process for playing summarized views of a media asset in a multi-window user interface, in accordance with alternative embodiments of the disclosure.

FIG. 14 depicts an illustrative flowchart of a process for playing summarized views of a media asset in a multi-screen user interface, in accordance with alternative embodiments of the disclosure. Process 1100 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1400 begins at 1401, where control circuitry 504 generates a summary view of a media asset including a plurality of content segments, which is stored at storage 508 in FIG. 5 or data source 616 via communications network 614 in FIG. 6. At 1402, control circuitry 504 identifies a first missed content segment (e.g., see missed content segment 201 in FIG. 2) that precedes a respective content segment (e.g., see content segment 202 in FIG. 2) from the plurality of content segments and a second missed content segment (e.g., see missed content segment 203 in FIG. 2) that immediately follows the respective content segment. At 1403, control circuitry 504 determines a first duration corresponding to the respective content segment, a second duration corresponding to the first missed content segment and a third duration corresponding to the third missed content segment. For example, the duration of each content segment 201-203 is determined as discussed in relation to FIG. 2. At 1404, control circuitry 504 displays, at a first rate, the respective content segment at a first window (e.g., 101 in FIG. 1) within the multi-screen user interface, e.g., on user equipment 106 in FIG. 1, and/or via the display 312 in FIG. 3, or any of 602, 604 and 606 in FIG. 6. At 1405, control circuitry 504 displays, at a second rate that is proportional to the first rate based on a ratio between the first duration and the second duration, the first missed content segment at a second window (e.g., screen 102 in FIG. 1) within the user interface screen, e.g., e.g., on user equipment 106 in FIG. 1, and/or via the display 312 in FIG. 3, or any of 602, 604 and 606 in FIG. 6. At 1406, control circuitry 504 displays, at a third rate that is proportional to the first rate based on a ratio between the first duration and the third duration, the second missed content segment at a third window (e.g., screen 103 in FIG. 1) within the multiple-screen user interface, e.g., on user equipment 106 in FIG. 1, and/or via the display 312 in FIG. 3, or any of 602, 604 and 606 in FIG. 6. For example, embodiments of determining a display rate corresponding to each window are discussed in relation to FIG. 13.

It should be noted that processes 700-1100 or any step thereof could be performed on, or provided by, any of the devices shown in, or described with respect to, FIGS. 1 and 5-6. For example, any of processes 700-1100 may be executed by control circuitry 504 (FIG. 5) as instructed by control circuitry implemented on user equipment 106 (FIG. 1), 602, 604, 606 (FIG. 6), and/or the like for generating and displaying a summary view of a media asset. In addition, one or more steps of processes 700-1100 may be incorporated into or combined with one or more steps of any other process or embodiment.

It is contemplated that the steps or descriptions of each of FIGS. 7-11 may be used with any other embodiment of this disclosure. In addition, the steps and descriptions described in relation to FIGS. 7-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 5-6 could be used to perform one or more of the steps in FIGS. 7-11.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining whether an event change has occurred during a missed segment, e.g., by processing circuitry 506 of FIG. 5. The processing circuitry, for instance, may be a general purpose processor, a customized integrated circuit (e.g., an ASIC), or a field-programmable gate array (FPGA) within user equipment 500, media content source 616, or media guidance data source 618. For example, each sentiment descriptor and the cause for the sentiment descriptor associated therewith, as described herein, may be stored in, and retrieved from, storage 508 of FIG. 5, or media guidance data source 618 of FIG. 6. Furthermore, processing circuitry, or a computer program, may update configuration data of the media guidance application, which may be stored within storage 508 of FIG. 5 or media guidance data source 618 of FIG. 6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing summarized views of a media asset in a multi-window user interface, the method comprising:

receiving a request to generate a summary view of a media asset for display;

identifying a plurality of content portions of the media asset;

for each respective content portion of the plurality of content portions, determining a respective importance level of the respective content portion based at least in part on metadata corresponding to the respective content portion; and in response to determining that the respective importance level is higher than an importance threshold, adding the respective content portion to a subset of the plurality of content portions;

identifying a respective content segment including one or more content portions from the subset of the plurality of content portions;

determining a first missed content segment including one or more of the plurality of content portions that precede an earliest play position of the subset;

determining a second missed content segment including one or more of the plurality of content portions that follow a latest play position of the subset;

generating for display, within a multi-window user interface, the respective content segment at a first window, the first missed content segment at a second window, and the second missed content segment at a third window; and synchronizing playback of the first missed content segment at the second window with the respective content segment at the first window; and synchronizing playback of the second missed content segment at the third window with the respective content segment at the first window.

2. The method of claim 1, further comprising:

determining a first duration corresponding to the respective content segment, a second duration corresponding to the first missed content segment, and a third duration corresponding to the second missed content segment;

wherein playback of the respective content segment at the first window occurs at a first rate, and wherein synchronizing playback of the first missed content segment at the second window with the respective content segment at the first window comprises:

adjusting playback of the first missed content segment at the second window to occur at a second rate that is proportional to the first rate based on a ratio between the first duration and the second duration; and wherein synchronizing playback of the second missed content segment at the third window with the respective content segment at the first window comprises:

adjusting playback of the second missed content segment at the third window at a third rate that is proportional to the first rate based on a ratio between the first duration and the third duration.

3. The method of claim 1, wherein the identifying a plurality of content portions of the media asset comprises:

determining a type of the media asset based on metadata associated with the media asset;

retrieving a pre-determined duration for a content portion corresponding to the type of the media asset; and tagging the media asset as the plurality of content portions, each content portion from the plurality of content portions having the pre-determined duration.

4. The method of claim 1, wherein determining a respective importance level of the respective content portion based at least in part on metadata corresponding to the respective content portion comprises:

determining a type of the media asset based on metadata associated with the media asset;

retrieving an importance table based on the type of the media asset;

extracting a first set of keywords from metadata corresponding to the respective content portion;

querying the importance table based on the first set of keywords to obtain one or more importance scores corresponding to the first set of keywords; and assigning an average value of the one or more importance scores to the respective importance level.

5. The method of claim 1, wherein determining a respective importance level of the respective content portion based at least in part on metadata corresponding to the respective content portion comprises:

extracting a first set of keywords from metadata corresponding to the respective content portion;

obtaining, during a period of time corresponding to the respective content portion, a plurality of publicly shared electronic communications by users, each of the plurality of publicly shared electronic communications including a first indicator relating to the media asset;

determining a subset of the plurality of publicly shared electronic communications that have one or more indicators corresponding to the first set of keywords;

determining a ratio of a total count of the subset of the plurality of publicly shared electronic communications and a total count of the plurality of publicly shared electronic communications; and assigning the ratio to the respective importance level.

6. The method of claim 4, wherein identifying a respective content segment including one or more content portions from the subset of the plurality of content portions comprises:

for a respective content portion that has been added to the subset of the plurality of content portions:

retrieving a first following content portion that immediately follows the respective content portion;

extracting a second set of keywords from metadata corresponding to the first following content portion;

comparing the first set of keywords corresponding to the respective content portion with the second set of keywords corresponding to the first following portion to determine a first overlap percentage between the first set of keywords and the second set of keywords;

in response to determining that the first overlap percentage is lower than an overlap threshold, refraining from identifying the first following content portion to the respective content segment; and in response to determining that the first overlap percentage is higher than the overlap threshold:

adding the first following content portion to the respective content segment;

retrieving a second following content portion that immediately follows the first following content portion, and determining a second overlap percentage between the first set of keywords and a third set of keywords extracted from metadata corresponding to the second following content portion;

in response to determining that the second overlap percentage is lower than the overlap threshold, refraining from identifying the second following content portion to the respective content segment; and in response to determining that the second overlap percentage is higher than the overlap threshold, adding the second following content portion to the respective content segment.

7. The method of claim 1, further comprising:
in response to generating for display the respective content segment at the first window, determining that an event change is missed;
determining that the event change occurred within the first missed content segment;
identifying a catch-up point within the first missed content segment; and
generating for display the first missed content segment from the catch-up point at the second window.

8. The method of claim 7, wherein determining that an event change is missed comprises:
retrieving a beginning content portion of the respective content segment;
extracting a first set of keywords from metadata corresponding to the beginning content portion;
retrieving a preceding content segment that precedes the earliest play position of the respective content segment;
extracting a second set of keywords from metadata corresponding to a last content portion of the preceding content segment;
comparing the first set of keywords and the second set of keywords to identify a subset of keywords from the first set of keywords that do not belong to the second set of keywords;
querying an event table based on the subset of keywords to determine whether there is a match; and
in response to determining a match between a keyword from the subset of keywords and an event on the event table, determining that an event change relating to the keyword has occurred between the last content portion and the beginning content portion.

9. The method of claim 7, wherein determining that an event change is missed comprises:
retrieving a beginning content portion of the respective content segment;
sampling a first set of frames from the beginning content portion;
retrieving a preceding content segment that precedes an earliest play position of the respective content segment;
sampling a second set of frames from a last content portion of the preceding content segment;
comparing each respective frame from the first set of frames with the second set of frames based on pattern recognition to obtain a similarity level;
in response to the comparison, identifying a subset of frames from the first set of frames, each frame having a similarity level compared to the second set of frames, wherein each similarity level is lower than a similarity threshold; and
in response to identifying the subset of frames, determining that an event change has occurred between the last content portion and the beginning content portion.

10. The method of claim 1, further comprising:
receiving a user indication to fast forward displayed content to a time point at the third window;
identifying a closest content portion, from the subset of the plurality of content portions, to the time point;
generating an estimated watch time for displayed content based on remaining displayed content at the third window;
adjusting remaining content portions, starting from the closest content portion, in the subset of the plurality of content portions to fit the estimated watch time; and
displaying the adjusted remaining content portions at the first window.

11. A system for providing summarized views of a media asset in a multi-window user interface, the system comprising:
communication circuitry;
input/output circuitry;
control circuitry configured to:
receive, via the communication circuitry, a request to generate a summary view of a media asset for display;
identify a plurality of content portions of the media asset;
for each respective content portion of the plurality of content portions,
determine a respective importance level of the respective content portion based at least in part on metadata corresponding to the respective content portion; and
in response to determining that the respective importance level is higher than an importance threshold, add the respective content portion to a subset of the plurality of content portions;
identify a respective content segment including one or more content portions from the subset of the plurality of content portions;
determine a first missed content segment including one or more of the plurality of content portions that precede an earliest play position of the subset;
determine a second missed content segment including one or more of the plurality of content portions that follow a latest play position of the subset;
generate for display, via the input/output circuitry and within a multi-window user interface, the respective content segment at a first window, the first missed content segment at a second window, and the second missed content segment at a third window; and
synchronizing playback of the first missed content segment at the second window with the respective content segment at the first window; and
synchronizing playback of the second missed content segment at the third window with the respective content segment at the first window.

12. The system of claim 11, wherein the control circuitry is further configured to:
determine a first duration corresponding to the respective content segment, a second duration corresponding to the first missed content segment, and a third duration corresponding to the second missed content segment;
wherein playback of the respective content segment at the first window occurs at a first rate, and wherein the control circuitry configured to synchronize playback of the first missed content segment at the second window with the respective content segment at the first window is further configured to:
adjust playback of the first missed content segment at the second window to occur at a second rate that is proportional to the first rate based on a ratio between the first duration and the second duration; and
wherein the control circuitry configured to synchronize playback of the second missed content segment at the third window with the respective content segment at the first window is further configured to:
adjust playback of the second missed content segment at the third window at a third rate that is proportional to the first rate based on a ratio between the first duration and the third duration.

13. The system of claim 11, wherein the control circuitry configured to identify a plurality of content portions of the media asset is further configured to:
    determine a type of the media asset based on metadata associated with the media asset;
    retrieve a pre-determined duration for a content portion corresponding to the type of the media asset; and
    tag the media asset as the plurality of content portions, each content portion from the plurality of content portions having the pre-determined duration.

14. The system of claim 11, wherein the control circuitry configured to determine a respective importance level of the respective content portion based at least in part on metadata corresponding to the respective content portion is further configured to:
    determine a type of the media asset based on metadata associated with the media asset;
    retrieve an importance table based on the type of the media asset;
    extract a first set of keywords from metadata corresponding to the respective content portion;
    query the importance table based on the first set of keywords to obtain one or more importance scores corresponding to the first set of keywords; and
    assign an average value of the one or more importance scores to the respective importance level.

15. The system of claim 11, wherein the control circuitry configured to determine a respective importance level of the respective content portion based at least in part on metadata corresponding to the respective content portion is further configured to:
    extract a first set of keywords from metadata corresponding to the respective content portion;
    obtain, during a period of time corresponding to the respective content portion, a plurality of publicly shared electronic communications by users, each of the plurality of publicly shared electronic communications including a first indicator relating to the media asset;
    determine a subset of the plurality of publicly shared electronic communications that have one or more indicators corresponding to the first set of keywords;
    determine a ratio of a total count of the subset of the plurality of publicly shared electronic communications and a total count of the plurality of publicly shared electronic communications; and
    assign the ratio to the respective importance level.

16. The system of claim 14, wherein the control circuitry configured to identify a respective content segment including one or more content portions from the subset of the plurality of content portions is further configured to:
    for a respective content portion that has been added to the subset of the plurality of content portions:
        retrieve a first following content portion that immediately follows the respective content portion;
        extract a second set of keywords from metadata corresponding to the first following content portion;
        compare the first set of keywords corresponding to the respective content portion with the second set of keywords corresponding to the first following portion to determine a first overlap percentage between the first set of keywords and the second set of keywords;
        in response to determining that the first overlap percentage is lower than an overlap threshold, refrain from identifying the first following content portion to the respective content segment; and
        in response to determining that the first overlap percentage is higher than the overlap threshold:
            add the first following content portion to the respective content segment;
            retrieve a second following content portion that immediately follows the first following content portion, and
            determine a second overlap percentage between the first set of keywords and a third set of keywords extracted from metadata corresponding to the second following content portion;
            in response to determining that the second overlap percentage is lower than the overlap threshold, refrain from identifying the second following content portion to the respective content segment; and
            in response to determining that the second overlap percentage is higher than the overlap threshold, add the second following content portion to the respective content segment.

17. The system of claim 11, wherein the control circuitry is further configured to:
    in response to generating for display the respective content segment at the first window, determine that an event change is missed;
    determine that the event change occurred within the first missed content segment;
    identify a catch-up point within the first missed content segment; and
    generate for display the first missed content segment from the catch-up point at the second window.

18. The system of claim 17, wherein the control circuitry configured to determine that an event change is missed is further configured to:
    retrieve a beginning content portion of the respective content segment;
    extract a first set of keywords from metadata corresponding to the beginning content portion;
    retrieve a preceding content segment that precedes the earliest play position of the respective content segment;
    extract a second set of keywords from metadata corresponding to a last content portion of the preceding content segment;
    compare the first set of keywords and the second set of keywords to identify a subset of keywords from the first set of keywords that do not belong to the second set of keywords;
    query an event table based on the subset of keywords to determine whether there is a match; and
    in response to determining a match between a keyword from the subset of keywords and an event on the event table, determine that an event change relating to the keyword has occurred between the last content portion and the beginning content portion.

19. The system of claim 17, wherein the control circuitry configured to determine that an event change is missed is further configured to:
    retrieve a beginning content portion of the respective content segment;
    sample a first set of frames from the beginning content portion;
    retrieve a preceding content segment that precedes the earliest play position of the respective content segment;
    sample a second set of frames from a last content portion of the preceding content segment;
    compare each respective frame from the first set of frames with the second set of frames based on pattern recognition to obtain a similarity level;

in response to the comparison, identify a subset of frames from the first set of frames, each frame having a similarity level compared to the second set of frames, wherein each similarity level is lower than a similarity threshold; and in response to identifying the subset of frames, determine that an event change relating has occurred between the last content portion and the beginning content portion.

20. The system of claim 11, wherein the control circuitry is further configured to:

receive a user indication to fast forward displayed content to a time point at the third window;

identify a closest content portion, from the subset of the plurality of content portions, to the time point;

generate an estimated watch time for displayed content based on remaining displayed content at the third window;

adjust remaining content portions, starting from the closest content portion, in the subset of the plurality of content portions to fit the estimated watch time; and display the adjusted remaining content portions at the first window.

\* \* \* \* \*